(12) United States Patent
Sharma et al.

(10) Patent No.: US 6,462,109 B1
(45) Date of Patent: Oct. 8, 2002

(54) SURFACTANTLESS LATEX COMPOSITIONS AND METHODS OF MAKING POLYMER BLENDS USING THESE COMPOSITIONS

(75) Inventors: Mahendra Kumar Sharma, Kingsport, TN (US); Linda Jane Adams, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/668,449

(22) Filed: Sep. 22, 2000

(Under 37 CFR 1.47)

Related U.S. Application Data

(60) Provisional application No. 60/159,044, filed on Oct. 12, 1999.

(51) Int. Cl.$^7$ .............................. C08L 67/00; C08L 79/00
(52) U.S. Cl. ...................... 523/501; 524/845; 524/871; 524/876
(58) Field of Search ................................ 524/845, 871, 524/876

(56) References Cited

U.S. PATENT DOCUMENTS

| | | |
|---|---|---|
| 2,683,730 | 7/1954 | Seeger et al. |
| 2,950,263 | 8/1960 | Abbotson et al. |
| 3,012,008 | 12/1961 | Lister |
| 3,097,191 | 7/1963 | France et al. |
| 3,384,653 | 5/1968 | Erner et al. |
| 3,394,164 | 7/1968 | Madison et al. |
| 3,642,964 | 2/1972 | Rausch, Jr. et al. |
| 3,644,457 | 2/1972 | König |
| 3,779,969 | 12/1973 | Clayton et al. |
| 3,883,571 | 5/1975 | Allport et al. |
| 4,031,026 | 6/1977 | Ibbotson |
| 4,115,429 | 9/1978 | Reiff et al. |
| 4,118,411 | 10/1978 | Reiff et al. |
| 4,177,177 | 12/1979 | Vanderhoff et al. |
| 4,202,957 | 5/1980 | Bonk et al. |
| 4,299,347 | 11/1981 | Roubier |
| 4,368,287 | 1/1983 | Ishikura et al. |
| 4,376,834 | 3/1983 | Goldwasser et al. |
| 4,458,050 | 7/1984 | Heyman |
| 4,567,236 | 1/1986 | Goldwasser et al. |
| 4,791,151 | 12/1988 | Kowalski et al. |
| 4,810,763 | 3/1989 | Mallya et al. |
| 4,885,350 | 12/1989 | Yamashita et al. |
| 4,946,932 | * 8/1990 | Jenkins ........................ 528/272 |
| 5,061,766 | 10/1991 | Yamashita et al. |
| 5,247,040 | 9/1993 | Amick et al. |
| 5,277,978 | 1/1994 | Feustel et al. |
| 5,349,026 | 9/1994 | Emmons et al. |
| 5,358,981 | 10/1994 | Southwick |
| 5,409,967 | 4/1995 | Carson et al. |
| 5,612,407 | 3/1997 | Southwick |
| 6,197,878 | * 3/2001 | Murray et al. ............... 524/804 |
| 6,255,366 | * 7/2001 | Adams et al. ............... 523/501 |
| 6,262,167 | 7/2001 | Weitzel et al. |

FOREIGN PATENT DOCUMENTS

| | | |
|---|---|---|
| EP | 0255137 | 2/1988 |
| JP | 60040182 | 3/1985 |
| JP | 63186703 | 8/1988 |
| JP | 64001786 | 1/1989 |
| JP | 04335002 | 11/1992 |
| JP | 06184217 | 7/1994 |
| WO | WO 97/28199 | 1/1997 |
| WO | WO 99/47578 | 3/1999 |

OTHER PUBLICATIONS

Odian, "Principles of Polymerization", Chapters 3, 4, John Wiley & Sons, 3$^{rd}$ Ed, 1991.*

* cited by examiner

Primary Examiner—Edward J. Cain
Assistant Examiner—James T. Yeh
(74) Attorney, Agent, or Firm—Bernard J. Graves, Jr. Esq.; Michael K. Carrier, Esq.

(57) ABSTRACT

The present invention relates to surfactantless latex compositions. More particularly, the present invention pertains to surfactantless latex compositions comprising sulfo-polyester polymers wherein the compositions have a continuous phase comprising water, diol, polyol or a mixture thereof. Still further, the present invention provides methods of making polymer blends comprising a condensation polymer and a latex polymer whereby the latex polymer is derived from a surfactantless latex composition comprising sulfo-polyester polymers. Polymer blends made by such methods are also provided.

15 Claims, No Drawings ically pointed out in the appended claims. It is
SURFACTANTLESS LATEX COMPOSITIONS AND METHODS OF MAKING POLYMER BLENDS USING THESE COMPOSITIONS

CROSS REFERENCE TO RELATED APPLICATIONS

This application claims priority to U.S. Provisional application Ser. No. 60/159,044, filed Oct. 12, 1999, the disclosure of which is herein incorporated by this reference.

FIELD OF THE INVENTION

The present invention relates to surfactantless latex compositions. More particularly, the present invention pertains to surfactantless latex compositions comprising sulfo-polyester polymers wherein the compositions have a continuous phase comprising water, diol, polyol or a mixture thereof. Still further, the present invention provides methods of making polymer blends comprising a condensation polymer and a latex polymer whereby the latex polymer is derived from a surfactantless latex composition comprising sulfo-polyester polymers. Polymer blends made by such methods are also provided.

BACKGROUND OF THE INVENTION

Traditional latex polymer compositions are dispersions of polymer particles stabilized by surfactant(s) in an aqueous medium Because the latex polymers are colloidal dispersions, the viscosity of a latex system will be lower at a given solids content when compared to a solution-based system. These low viscosity latex dispersions have the capability of delivering a high solids content to an application without the attendant problems associated with high viscosity systems.

In such colloidal dispersions, the continuous medium plays a dominant role in controlling the viscosity of the system. Generally, the continuous phase in a latex polymerization process is water. Water is safe and available in abundant quantities in most locations. It also has low toxicity and flammability.

Solvents other than water may be used in the continuous phase. For example, the addition of diol solvents in minor amounts is known. JP 04335002 discloses the addition of alcohol(s) as an antifreeze agent for the production of vinyl ester emulsions at low temperatures. The amount of the diol solvent disclosed is below 50 wt. %. JP 63186703 discloses the addition of film forming agents and plasticizers in an amount up to 10 wt. % of the solid component to effect film formation properties of the resulting emulsion. JP 06184217 discloses the addition of polyols and water-soluble inorganic salts to vinyl chloride suspension polymerizations to produce vinyl chloride polymers that have good powder fluidity. EP 255137 discloses the use of water soluble alcohol in a water/alcohol level of 100/0 to 50/50 for producing polyvinylester with a high degree of polymerization.

U.S. Pat. No. 3,779,969 describes the use of propylene diol or diethylene diol in amounts of 10 to 50 wt % of the emulsion. The ethylene diol is added to impart improved wetting properties to the emulsion.

U.S. Pat. No. 4,458,050 describes a process for the manufacture of polymer dispersions in diol chain extenders. The patent relates to the production of polymers, which have low viscosity, for the preparation of polyurethanes. The '050 patent does not disclose compositions that result in stabilized latexes in diol solvents. The patent also discloses large amounts of polymeric stabilizers to produce the dispersion polymer.

JP 60040182 and JP 64001786 disclose compositions for water-oil repellency for fabric treatment. The compositions are aimed at producing fluoropolymer emulsions in a mixture of diol solvents. Such fluoropolymers are not the subject of this invention.

U.S. Pat. No. 4,810,763 discloses suspension polymerization in an organic medium for the preparation of pressure sensitive adhesives. The compositions described in the '763 patent are specifically aimed at producing large particle size dispersions. This patent does not disclose compositions with latexes having a particle size below 1000 nm. This reference also does not disclose emulsion polymerization.

U.S. Pat. Nos. 4,885,350 and 5,061,766 disclose the dispersion polymerization of vinyl monomers in hydrophilic organic liquids. To produce the dispersion polymer, large amounts of polymeric dispersion stabilizers are taught.

U.S. application Ser. No. 09/262,156, the disclosure of which is herein incorporated in its entirety, discloses the preparation of latex polymer compositions prepared in a continuous medium comprising diols or polyols. Such diol latex compositions are usually prepared via emulsion polymerization. U.S. application Ser. No. 09/262,156 further discloses the incorporation of these diol latex compositions into a condensation polymerization reaction whereby a latex/condensation polymer blend is obtained. However, in practice of the invention, it has been noticed that when the diol latexes are added to a condensation polymerization reaction foam may be generated. Such foaming is believed to be caused by surfactants used in the diol latex compositions to provide stabilization or to control the particle size of the latex polymer particles in the continuous medium.

Given the problems recognized when diol latex compositions include surfactant, it would be desirable in some circumstances to eliminate surfactant from such compositions. It would further be desirable to prepare latex/condensation polymer blends without surfactant in order to reduce the propensity for such materials to foam during the manufacturing process and to increase the durability of the resulting product.

SUMMARY OF THE INVENTION

The present invention relates to surfactantless latex compositions. More particularly, the present invention pertains to surfactantless latex compositions comprising sulfo-polyester polymers wherein the compositions have a continuous phase comprising water, diol, polyol or a mixture thereof. Still further, the present invention provides methods of making polymer blends comprising a condensation polymer and a latex polymer whereby the latex polymer is derived from a surfactantless latex composition comprising sulfo-polyester polymers. Polymer blends made by such methods are also provided.

Additional advantages of the invention will be set forth in part in the description that follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, and, as such, may, of course, vary. It is also to be understood that the terminology used herein is for the purpose of describing particular embodiments only and is not intended to be limiting.

In this specification and in the claims which follow, reference will be made to a number of terms, which shall be defined to have the following meanings:

The singular forms a, an and the include plural referents unless the context clearly dictates otherwise.

"Optional" or "optionally" indicate that the subsequently described event or circumstances may or may not occur, and that the description included instances where said event or circumstance occurs and instances where it does not.

"Latex" is herein defined as a dispersion of polymeric particles in a continuous phase, the polymeric particles preferably having a size range of from 10 to 1000 nm "Latex particle" is herein defined as such a polymeric particle, which is dispersed in a continuous phase.

"Diol" is a synonym for glycol or dihydric alcohol. "Polyol" is a polyhydric alcohol containing three or more hydroxyl groups. As used herein, the term "diol" to describe the compositions of the invention does not mean that compositions do not comprise polyol. Rather, in such circumstances, the term "diol" shall be used to include the possibility that the compositions of the invention comprise polyols.

The abbreviation "nm" means nanometers.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

Throughout this application, where publications are referenced, the disclosures of these publications in their entireties are hereby incorporated by reference into this application in order to more fully describe the state of the art to which this invention pertains.

In one aspect, the invention relates to a surfactantless latex composition comprising (a) latex polymer particles comprising a residue of an ethylenically unsaturated monomer; (b) a sulfo-polyester polymer; and (c) a diol component; wherein the latex polymer particles are dispersed in a liquid continuous phase and wherein the latex composition is surfactantless.

In a further aspect, the invention relates to, a method of making a condensation polymer/latex polymer blend comprising the steps of: preparing a surfactantless latex composition comprising: i) a sulfo-polyester polymer; and ii) a latex polymer dispersed in a liquid continuous phase; (b) introducing the surfactantless latex composition into a condensation polymerization reaction medium prior to or during a condensation polymerization reaction, wherein the condensation polymerization reaction medium comprises (1) a diacid, diisocyanate, dialkyl carbonate, esters, diaryl carbonate, dihalo carbonate or a mixture thereof, wherein at least one of the liquid continuous phase, the condensation polymerization reaction medium, or the sulfo-polyester comprises a diol component; and (a) polymerizing the diol component and component b(1), thereby forming a condensation polymer/latex polymer blend.

In yet a further aspect, the invention relates to a method of making a latex/condensation polymer blend comprising the steps of: preparing a surfactantless latex composition comprising i) a latex polymer dispersed in a liquid continuous phase; and ii) a sulfo-polyester polymer; introducing the surfactantless latex composition into a glycolysis reaction medium prior to or during the glycolysis reaction wherein the glycolysis reaction medium comprises a polyester, copolyester, polyesteramide, polycarbonate or a mixture thereof; wherein at least one of the liquid continuous phase, the gylcolysis reaction medium or the sulfo-polyester comprises a diol component; and polymerizing the fully or partially glycolyzed polyester, copolyester, polyesteramide, polycarbonate or mixture thereof, thereby providing a latex/condensation polymer blend.

Still further, the invention relates to a polymer blend comprising a latex polymer, a sulfo-polyester polymer and a condensation polymer.

In a further aspect, the invention relates to a method of making a latex/condensation polymer blend comprising the steps of: preparing a surfactantless latex composition comprising i) a latex polymer in a liquid continuous phase; and ii) a sulfo-polyester polymer; introducing the surfactantless latex composition into a condensation polymer; and extruding the surfactantless latex composition and the condensation polymer, thereby providing a latex/condensation polymer blend.

I. Surfactantless Latex Compositions

In a first major aspect, the invention concerns the preparation of a surfactantless latex composition, wherein the continuous phase of the composition comprises a diol component, a polyol component or a mixture thereof. The compositions may also optionally include a water component. The surfactantless latex compositions may be used for a variety of purposes, including, but not limited to, ink compositions, pigment concentrates, coatings, and as reactants in condensation polymerization processes.

In one aspect, the surfactantless latex composition comprises a latex polymer and a continuous phase, a continuous phase comprising a diol component, a polyol component or a mixture thereof; the compositions may also comprise a water component. As used herein, the term "latex composition" includes latexes comprised of both core-shell and/or non-core-shell latex polymers.

As used herein, the term "surfactantless" means that the compositions of the present invention are essentially free of any surfactant. In an aspect of the invention herein, there may be no surfactant present in the latex compositions. Rather, the latex compositions can be stabilized utilizing sulfo-polyester polymer materials as set forth below. However, it is contemplated that some surfactant may be present in the compositions resulting from inclusion of surfactant in the raw materials comprising the latex compositions or by way of contamination. Such compositions are still considered surfactantless according to the invention herein.

The surfactantless latex compositions may be prepared by a variety of methods, including, but not limited to, emulsion, suspension, dispersion polymerization and mechanical emulsification. In general, dispersion and suspension polymerization produce larger particle sizes, typically in the range of from about 1 to about 500 microns, while emulsion polymerization produces particles of smaller sizes, typically in the range of about 10 to about 1000 nanometers.

Emulsion, suspension, dispersion and mechanical emulsification polymerization are known techniques of forming latex compositions. Such methods may also be utilized to prepare the surfactantless compositions disclosed herein. If dispersion polymerization is selected to prepare the surfactantless latex composition that is introduced into a condensation polymerization reaction as disclosed later, processes similar to those described in U.S. Pat. No. 4,885,350 and U.S. Pat. No. 5,061,766 may be used to prepare surfactantless latex compositions having a particle size range of about 1 micron to about 100 microns. If mechanical emulsification is used, processes similar to those described in U.S. Pat. Nos. 4,177,177, 5,358,981 and 5,612,407 may be utilized. The disclosures of each of the patents mentioned in this paragraph are herein incorporated in their entireties.

In one aspect, the surfactantless latex compositions of this invention are prepared via emulsion polymerization. The solids content of the emulsion polymerization reaction may be from about 5 to about 60% by weight, or from about 20 to about 50% by weight. The particle size of the latex polymer particles of the surfactantless latex composition may be below about 1000 nm or from about 20 to about 700 nm, or from about 60 to about 250 mm. The temperature of the reaction may be from about 0 to about 190° C., or from about 35 to about 95° C.

In U.S. application Ser. No. 09/262,156, the disclosure of which is herein incorporated in its entirety, surfactants were used in the emulsion polymerization of the diol latex compositions disclosed therein to provide stabilization to the latex polymer particles in the continuous medium However, in some applications, the presence of surfactant in the compositions results in excessive foaming or a lessening of the quality of the resulting product. With the instant invention, it has been discovered that by stabilizing the latex compositions by means other than surfactants, the properties of the resulting latex compositions may be markedly improved for some end-uses. Further, the absence of surfactant from the compositions improves the processes of using such compositions as co-reactants in condensation polymerization reactions, as well as improving the resulting properties of condensation polymer blends prepared according to Section II below.

Instead of utilizing surfactants as stabilizers in the latex compositions of the present invention, sulfo-polyester polymer stabilizers may be utilized. In one aspect of the invention herein, a low molecular weight sulfo-polyester polymer may be utilized as a latex particle stabilizer in the surfactantless latex compositions. When included in the surfactantless latex compositions of the present invention, the sulfo-polyester polymer can provide steric and ionic stabilization to latex particles to maintain the particles suspended in the continuous phase. Such stabilization is believed to result from the anionically charged groups in the polyester polymer chain of the sulfo-polyester polymer. Accordingly, there may be no need to include surfactant in the compositions because the sulfo-polyester polymers take the place thereof.

The sulfo-polyester polymers utilized as stabilizers of the surfactantless latex compositions herein contain a sulfo group. In a separate aspect, the sulfo-polyesters may be linear polymers dispersible in the surfactantless latex compositions in the temperature range of about 40 to about 90° C. The sulfo-polyester polymers of the present invention may contain repeat units comprising a dicarboxylic acid, a diol and a difunctional sulfo-monomer.

Dicarboxylic acids useful in the present invention include aromatic dicarboxylic acids preferably having from about 8 to about 14 carbon atoms, saturated aliphatic dicarboxylic acids preferably having from about 4 to about 12 carbon atoms, and cycloaliphatic dicarboxylic acids preferably having from about 8 to about 12 carbon atoms. Examples of particularly preferred dicarboxylic acids are: terephthalic acid; phthalic acid; isophthalic acid; naphthalene-2,6-dicarboxylic acid; cyclohexanedicarboxylic acid; cyclohexanediacetic acid; diphenyl-4,4'-dicarboxylic acid; succinic acid; glutaric acid; adipic acid; azelaic acid; sebacic acid; and the like. In further aspects, the sulfo-polyester may be prepared from two or more of the above dicarboxylic acids. It should be understood that use of the corresponding acid anhydrides, esters, and acid chlorides of these acids is included in the term "dicarboxylic acids."

The diol component of the low molecular weight sulfo-polyester polymers may include cycloaliphatic diols preferably having from about 6 to about 20 carbon atoms or aliphatic diols preferably having from about 3 to about 20 carbon atoms. Examples of such diols are: ethylene glycol; diethylene glycol; triethylene glycol; 1,4-cyclohexanedimethanol; propane-1,3-diol; butane-1,4-diol; pentane-1,5-diol; hexane-1,6-diol; 3-methyl-2,4-pentanediol; 2-methyl-1,4-pentanediol; 2-2-4-trimethyl-1,3-pentanediol; 1,3-hexanediol; 1,4-di-(hydroxyethoxy)-benzenediol; 2,2-bis-(4-hydroxycyclohexyl)-propanediol; 2,4-dihydroxy-1,1,3,3-trimethyl-cyclobutanediol; 2,2-bis-(4-hydroxypropoxyphenyl)-propanediol; or a mixture thereof. In further aspects, the sulfo-polyester polymer may be prepared from two or more of the above diols.

The difunctional sulfo-monomer component of the sulfo-polyester polymer may be a dicarboxylic acid or an ester thereof containing a sulphonate group ($-SO_3-$), a diol containing a sulfonate group, or a hydroxy acid containing a sulfonate group. The cation of the sulfonate salt may be $Na^+$, $Li^+$, $K^+$, $NH_4^+$, and substituted ammonium The term "substituted ammonium" refers to ammonium substituted with an alkyl or hydroxy alkyl radical having from about 1 to about 4 carbon atoms. In one aspect, the difunctional sulfo-monomers may contain at least one sulfonate group attached to an aromatic nucleus wherein the functional groups are hydroxy, carboxy or amino. Advantageous difunctional sulfo-monomer components are those wherein the sulfonate salt group is attached to an aromatic acid nucleus such as benzene, naphthalene, diphenyl, oxydiphenyl, sulfonyldiphenyl or a methylenediphenyl nucleus. In separate aspects of the invention herein, sulfophthalic acid, sulfoterephthalic acid, sulfoisophthalic acid, 4-sulfonaphthalene-2,7-dicarboxylic acid, and their esters are utilized. In a further aspect, the sulfo-monomer may be present in the amount of at least about 10 mole percent, or from about 8 to about 25 mole percent, or from about 12 to about 20 mole percent, based on 100 mole percent dicarboxylic acid.

The inherent viscosity (IV) of the sulfo-polyesters utilized in the invention herein may be in the range of from about 0.1 to about 0.5 dl/g as measured in a 60/40 parts by weight solution of phenol/terachloroethane at 25° C. at a concentration of 0.25 grams of polymer in 100 mL of the solvent. The inherent viscosity of the sulfo-polyester may be from about 0.28 to about 0.35 dl/g.

In further aspects, the sulfo-polyesters utilized in the present invention are as follows:

| Sulfo-polyester polymers | IPA Mole % | SIP Mole % | DEG Mole % | CHDM Mole % | EG Mole % | I.V. | $T_g$ |
|---|---|---|---|---|---|---|---|
| A | 89 | 11 | 100 | — | — | 0.42 | 29 |
| B | 89 | 11 | 72 | — | 28 | 0.43 | 35 |
| C | 89 | 11 | 78 | 22 | — | 0.36 | 38 |
| D | 76 | 24 | 76 | 24 | — | 0.29 | 48 |
| E | 82 | 18 | 54 | 46 | — | 0.33 | 55 |

In a further aspect of the invention herein, the sulfo-polyester polymer stabilizers are branched. The sulfo-polyester polymers utilized in the invention may have a branched structure by virtue of the inclusion of multi-functional branching agent moieties during the condensation of the sulfo-polyester polymer. Multi-functional branching agent moieties have at least three functional groups, comprising hydroxyl, carboxyl, amino, or copolymerizable derivatives of hydroxyl, carboxyl, or amino functional groups. The three or more functional groups are bonded to a common organic residue of the multifunctional branching agent. The chemical or geometrical structure of the organic residue is not particularly critical, and may comprise any $C_2$–$C_{25}$ substituted or unsubstituted alkylene, alkyl aryl, or heterocyclic organic residue, which spaces the functional groups so that they are chemically accessible for polymerization. Multi-functional branching agents having four or more functional groups, and typically even more functional groups can also be suitable.

In certain preferred embodiments, the multi-functional branching agent may be:
 (a) an aliphatic polyol;
 (b) an aromatic polyol;
 (c) an aliphatic polyamine;
 (d) an aromatic polyamine;
 (e) an aliphatic polycarboxylic acid, or the ester, or anhydride thereof;
 (f) an ethanolamine; or
 (g) ethylenediaminetetraacetic acid, or a salt or lower akyl ester thereof.

Aliphatic polyol multi-functional branching agent moieties may include trimethylolpropane, trimethylolethane, glycerine, trinethylol propane, pentaerythritol, trimethylol propane; erythritol, threitol, dipentaerythritol, or sorbitol. Trimethylolpropane can be the aliphatic multi-functional branching agent, primarily because of its low cost and ready availability.

Aromatic polyol multi-functional branching agent moieties may include phloroglucinol, tris(hydroxyphenyl)ethane, or tris(hydroxyphenyl)methane, or lower alkyl or aryl esters thereof. Additional multi-functional branching agent moieties may include trimellitic acid, trimellitic anhydride, pyromellitic dianhydride, 1,3,5-triamino cylohexane, 3,3',4,4'-tetraminobiphenyl, triethanolamine, or dimethylolpropionic acid.

The quantity of the multifunctional branching agent moieties may range from about 0.1 to about 40 mole %, or, from about 1 to about 20 mole %, or from about 2 to about 6 mole % of the monomeric moieties condensed to form the water-dispersible sulfo-polyester polymer. Alternative lower concentration limits for the multifunctional branching agent may include about 0.5, about 1.5, about 2.5, about 3, and about 4 mole %.

In a further aspect, the sulfo-polyesters may be unsaturated. The unsaturated copolymerizable acid or diol moieties, such as maleic acid, fumaric acid, itaconic acid, 4-carboxyl cinnamic acid, 2-butene-1,4-diol, 2-pentene-1,5-diol and the like, may be incorporated into the polymer chain, generally at from about 5 to about 20 mole percent of the total acid or total diol components.

The low molecular weight sulfo-polyester polymer stabilizer may or may not be reactive in the emulsion polymerization reaction in which the latex polymer compositions are prepared. In one aspect, useful sulfo-polyester polymer stabilizers contain sulfonate salts as a part of the polyester chain. Polyesters may include, but are not limited to, polymerizable or nonpolymerizable groups with different percentages of anionic content in the polyester.

In one aspect of the invention herein, sulfo-polyester polymer dispersions may be used as stabilizers for diol-based latexes. The molecular weight of the sulfo-polyester polymers used as stabilizers may be in the range of from about 5,000 to about 50,000; or from about 8,000 to about 25,000; or from about 10,000 to about 20,000.

Diol components useful for the continuous phase of the surfactantless latex compositions may include, but are not limited to, any aliphatic or cycloaliphatic diol having from about 2 to about 10 carbon atoms or a mixture thereof. Diols may include ethylene diol; 1,3-trimethylene diol; propylene diol; 1,4-butanediol; 1,5-pentanediol; 1,6-hexanediol; 1,7-heptanediol; 1,8-octanediol; 1,9-nonanediol; neopentyl diol; cis- or trans-cyclohexanedimethanol, cis- or trans-2,2,4,4-tetramethyl-1,3-cyclobutanediol; diethylene diol; 2,2,4-trimethyl-1,3-pentanediol; 2-methyl-1,3-propanediol; 2-methyl-1,3-pentanediol; or a mixture thereof. Further diols may include ethylene diol; propylene diol; 1,4-butanediol; diethylene diol; neopentyl diol; cis and trans-cyclohexanedimethanol; or a mixture thereof. Even more preferred diols include neopentyl diol; ethylene diol; cis or trans cyclohexanedimethanol; 1,4 butanediol; or a mixture thereof.

In one aspect, the monomer, initiator and sulfo-polyester polymer are present in a dispersed phase of the surfactant-less latex compositions and the diol component is present in a continuous phase of the compositions.

In addition to the diol component, the continuous phase may contain one or more polyol components. Representative polyol components that may be used in the continuous phase include, but are not limited to, glycerol; trimethylolpropane; pentaerythritol; 1,2,6-hexanetriol; sorbitol; 1,1,4,4-tetrakis(hydroxymethyl)cyclohexane; tris-(2,hydroxyethyl)isocyanurate; dipentaerythritol; or mixtures thereof. In addition to low molecular weight polyols, higher molecular weight polyols (MW from about 400 to about 3000), triols derived by condensing alkylene oxides having from about 2 to about 3 carbons, e.g., ethylene oxide or propylene oxide, with polyol initiators, having from about 3 to about 6 carbons, e.g., glycerol, can also be used.

The latex polymers of the surfactantless latex compositions may be prepared by any conventional means known in the art. The monomers that are used to form the latex polymers may be broadly characterized as ethylenically unsaturated monomers. These include, but are not limited to, non-acid vinyl monomers, acid vinyl monomers and/or mixtures thereof. The latex polymers of the invention may be copolymers of non-acid vinyl monomers and acid monomers, mixtures thereof and their derivatives. The latex polymers of the invention may also be homopolymers of ethylenically unsaturated monomers.

Suitable non-acid vinyl monomers that may be used to prepare the latex polymer include, but are not limited to, acetoacetoxy ethyl methacrylate; acetoacetoxy ethyl acrylate; methyl acrylate; methyl methacrylate; ethyl acrylate; ethyl methacrylate; butyl acrylate; butyl methacrylate; isobutyl acrylate; isobutyl methacrylate; ethylhexyl acrylate; isoprene; octyl acrylate; octyl methacrylate; iso-octyl acrylate; iso-octyl methacrylate; trimethyolpropyl triacrylate; styrene; α-methyl styrene; glycidyl methacrylate; carbodi-imide methacrylate; $C_1$–$C_{18}$ alkyl crotonates; di-n-butyl maleate; α or β-vinyl naphthalene; di-octylmaleate; allyl methacrylate; di-allyl maleate; di-allylmalonate; methyoxybutenyl methacrylate; isobornyl methacrylate; hydroxybutenyl methacrylate; hydroxyethyl(meth)acrylate; hydroxypropyl(meth)acrylate; acrylonitrile; vinyl chloride; vinylidene chloride; vinyl acetate; vinyl ethylene carbonate; epoxy butene; 3,4-dihydroxybutene; hydroxyethyl(meth)acrylate; methacrylamide; acrylamide; butyl acrylamide;

ethyl acrylamide; butadiene; vinyl ester monomers; vinyl (meth)acrylates; isopropenyl(meth)acrylate; cycloaliphaticepoxy(meth)acrylates; ethylformamide; 4-vinyl-1,3-dioxolan-2-one; 2,2-dimethyl-4 vinyl-1,3-dioxolane; 3,4-di-acetoxy-1-butene or a mixture thereof. Suitable monomers are described in *The Brandon Associates*, 2nd edition, 1992 Merrimack, N.H., and in *Polymers and Monomers*, the 1996–1997 Catalog from Polyscience, Inc., Warrington, Pa., U.S.A.

Acid vinyl monomers that may be used to prepare the latex polymer include, but are not limited to, acrylic acid; methacrylic acid; itaconic acid; crotonic acid; and monovinyl adipate.

Monomers that may be useful for making the latex polymer/(co)polymer are ethylenically unsaturated monomers including, but not limited to, acrylates; methacrylates; vinylesters; styrene; styrene derivatives; vinyl chloride; vinylidene chloride; acrylonitrile; isoprene; and butadiene. In a further aspect, the latex polymer comprises (co) polymers made from monomers of 2-ethyl-hexyl acrylate; styrene; butylacrylate; butylmethacrylate; ethylacrylate; methylmethacrylate; butadiene; and isoprene.

In a further aspect, the latex polymer has a weight average molecular weight (Mw) of from about 10,000 to about 2,000,000 as determined by gel permeation chromatography (GPC), more preferably the latex polymer has a weight average molecular weight of from about 50,000 to about 1,000,000. In one aspect, the glass transition temperature (Tg) of the latex polymer is in the range of about −90.0 to about 130° C., or from about −70 to about 110° C., or from about −60 to about 100° C. or from about −60 to about 90° C.

The surfactantless latex compositions of this invention may be characterized as stabilized latexes in a continuous phase, wherein the continuous phase comprises diol, water, polyol or a mixture thereof. A stable latex is defined for the purposes of this invention as one in which the particles are colloidally stable, i.e., the latex particles remain dispersed in the continuous phase for long periods of time, such as about 24 hours, or about 48 hours, and, or about several weeks. The latex particles may also remain dispersed for about several months.

Monomers that may be useful for making the core-shell latex polymer/(co)polymer are ethylenically unsaturated monomers including, but not limited to, acrylates; methacrylates; vinylesters; styrene; styrene derivatives; vinyl chloride; vinylidene chloride; acrylonitrile; isoprene; butadiene; or a mixture thereof. In a further aspect, the core-shell latex polymer comprises (co)polymers made from monomers of 2-ethyl-hexyl acrylate; styrene; butylacrylate; butylmethacrylate; ethylacrylate; methylmethacrylate; butadiene; and isoprene.

The core/shell polymer particles may also be prepared in a multi-layer form, a peanut shell, an acorn form, or a raspberry form In such particles, the core portion can comprise from about 20 to about 80 percent of the total weight of said particle and the shell portion can comprise from about 80 to about 20 percent of the total weight volume of the particle.

In one aspect, chain transfer agents are used to prepare the latex polymer. Typical chain transfer agents are those known to one of skill in the art. Chain transfer agents that may be used in an emulsion polymerization reaction to form the surfactantless latex compositions include, but are not limited to, butyl mercaptan; dodecyl mercaptan; mercaptopropionic acid; 2-ethylhexyl-3-mercaptopropionate; n-butyl-3-mercaptopropionate; octyl mercaptan; isodecyl mercaptan; octadecyl mercaptan; mercaptoacetate; allyl mercaptopropionate; allyl mercaptoacetate; crotyl mercaptoproprionate; crotyl mercaptoacetate; and the reactive chain transfer agents disclosed or described in U.S. Pat. No. 5,247,040, which is incorporated herein in its entirety by this reference. The chain transfer agent may be selected from the mercaptans and various alkyl halides, including but not limited to carbon tetrachloride; more preferably the chain transfer agent is 2-ethylhexyl-3-mercaptopropionate. Chain transfer agents can be added in amounts from about 0 to about 2 parts phm (phm-per hundred monomer), more preferably about 0 to about 0.5 phm.

The latex polymers of the invention can be uncrosslinked or crosslinked. When crosslinked, suitable crosslinking agents include multifunctional unsaturated compounds including, but not limited to, divinyl benzene; allyl methacrylate; allyl acrylate; multifunctional acrylates; or a mixture thereof. Suitable multifunctional acrylates include, but are not limited to, ethylene diol dimethacrylate; ethylene diol diacrylate; trimethylolpropane triacrylate; trimethylolpropane trimethacrylate; pentaerythritoltetraacrylate; or a mixture thereof. The amount of the crosslinling monomer in the emulsion polymerization can be controlled to vary the gel fraction of the latex from about 20 to about 100 percent. The gel fraction is the amount that will not dissolve in a good solvent.

The latex particles may be functionalized by including monomers with pendent functional groups. Functional groups that may be incorporated in the latex particle include, but are not limited to, epoxy groups; acetoacetoxy groups; carbonate groups; hydroxyl groups; amine groups; isocyanate groups; amide groups; or a mixture thereof. The functional groups may be derived from a variety of monomers, including, but not limited to, glycidyl methacrylate; acetoacetoxy ethyl methacrylate; vinyl ethylene carbonate; hydroxyl ethyl methacrylate; t-butylaminoethyl methacrylate; dimethylamino methacrylate; m-isopropenyl-alpha, alpha-dimethylbenzyl isocyanate; acrylamide; n-methylolacrylamide; or a mixture thereof. The addition of functional groups allows for further reaction of the polymer after latex synthesis. The functionality may be useful to impart latent crosslinling or it may be used to react with condensation polymers as discussed below.

Initiators can be used in the emulsion polymerization to form the surfactantless latex compositions. Initators may include, but are not limited to, salts of persulfates, water or diol soluble organic peroxides and azo type initiators. Initiators may include, but are not limited to hydrogen peroxide; potassium peroxydisulfate; ammonium peroxydisulfate; dibenzoyl peroxide; lauryl peroxide; ditertiary butyl peroxide; 2,2'-azobisisobutyronitrile; t-butyl hydroperoxide; benzoyl peroxide; or a mixture thereof. Redox initiation systems (Reduction Oxidation Initiation) such as the iron catalyzed reaction of t-butyl hydroperoxide with isoascorbic acid are also useful. In one aspect, initiators capable of generating a strong acid as a by-product are not utilized. This avoids possible side reactions of the diol component of the solvent with the acid. Initiators can be added in amounts from about 0.1 to about 2 phm, or from about 0.3 to about 0.8 phm. Also, as discussed below, buffers may be utilized to minimize the formation of strong-acid by-products.

Reducing agents may also be used in the emulsion polymerization. Suitable reducing agents are those that increase the rate of polymerization and include, for example, sodium bisulfite; sodium hydrosulfite; sodium formaldehyde sulfoxylate; ascorbic acid; isoascorbic acid; or a mixture thereof. If a reducing agent is introduced into the emulsion polymerization, it may be added in an amount of from about 0.1 to about 2 phm, or from about 0.3 to about 0.8 phm. In one aspect, the reducing agent may be fed into the reactor over a period of time.

Buffering agents may also be used in the diol-containing emulsion polymerization to control the pH of the reaction. Suitable buffering agents include, but are not limited to, ammonium and sodium salts of carbonates and bicarbonates. The buffering agents may be included when using acid generating initiators, including, but not limited to, the salts of persulfates.

Polymerization catalysts may also be used in the emulsion polymerization. Polymerization catalysts are those compounds that increase the rate of polymerization and which, in combination with the above described reducing agents, may promote decomposition of the polymerization initiator under the reaction conditions. Suitable catalysts include, but are not limited to, transition metal compounds such as, for Aexample, ferrous sulfate heptahydrate; ferrous chloride; cupric sulfate; cupric chloride; cobalt acetate; cobaltous sulfate; or a mixture thereof.

In one aspect, a surfactantless latex composition is prepared by forming a mixture comprising monomers, an initiator, a sulfo-polyester stabilizer and a continuous phase. In one aspect of the invention herein, the continuous phase comprises a diol component. In this aspect, the diol component comprises from about 0.01 to about 90% by weight of the continuous phase. In further aspects, the diol component comprises from about 10 to about 100% by weight of the continuous phase, from about 20 to about 100% by weight of the continuous phase, from about 30 to about 100% by weight of the continuous phase, from about 40 to about 100% by weight of the continuous phase, and from about 50 to about 100% by weight of the continuous phase. In further aspects, the diol comprises from about 60 to about 100% by weight of the continuous phase, from about 70 to about 100% by weight of the continuous phase, from about 80 to about 100% by weight of the continuous phase, or from about 90 to about 100% by weight of the continuous phase.

In a further aspect of the invention herein, the continuous phase comprises a water component. In this aspect, the water component comprises from greater than about 0.01 to about 90% by weight of the continuous phase. In further aspects, the water component comprises from about 5 to about 90% by weight of the continuous phase, yet further, the water component comprises from about 10 to about 90% by weight of the continuous phase, or from about 20 to about 90% by weight of the continuous phase, or from about 30 to about 90% by weight of the continuous phase, or from about 40 to about 90% by weight of the continuous phase, or from about 50 to about 90% by weight of the continuous phase. In further aspects, the water component comprises from about 60 to about 90% by weight of the continuous phase, or from about 70 to about 90% by weight of the continuous phase, or from about 80 to about 90% by weight of the continuous phase.

The mixture is then heated which causes the monomer to polymerize and form the latex polymers. Typically, the monomer is fed into the reactor over a period of time, and a separate initiator feed is also fed into the reactor over time.

The surfactantless latex composition may contain a stabilizer in addition to the sulfo-polyester or a stabilizer does not have to be present. Stabilizers suitable for use in the surfactantless latex compositions include, but are not limited to, an anionic stabilizer, a nonionic stabilizer, an amphoteric suspension stabilizer or a mixture thereof. The stabilizer must be dispersible or soluble in the continuous phase, but should be substantially insoluble with the monomers. If present, the concentration of the stabilizer is from about 3 to about 15 percent by weight of the monomers, preferably from about 7 to about 8 percent by weight of the monomers.

As the diol concentration in the continuous phase approaches about 100%, the wetting properties of the surfactantless latex composition for hydrophobic surfaces may increase, and the surfactantless latex composition may become less volatile. The reduced volatility of the surfactantless latex composition is especially advantageous when the surfactantless latex composition is used in a condensation polymerization reaction as disclosed below.

The surfactantless latex compositions of the invention may be useful in a variety of coating compositions such as architectural coatings, maintenance coatings, industrial coatings, automotive coatings, textile coatings, inks, adhesives, and coatings for paper, wood, and plastics. Accordingly, the present invention further relates to such coating compositions containing a surfactantless latex composition of the invention. The surfactantless latex compositions of the invention may be incorporated in those coating compositions in the same manner as known polymer latexes and used with the conventional components and/or additives of such compositions. The coatings may be clear or pigmented.

If properly stabilized, the surfactantless latex composition retains its integrity and remains a dispersed phase within the resulting condensation polymer matrix. Thus, with the invention herein, it has been determined that a more durable and lasting coating composition may result because surfactant will not migrate through the coating which can lessen markedly the potential for deterioration.

Upon formulation, a coating composition containing a surfactantless latex composition of the invention may be applied to a variety of surfaces, substrates, or articles, e.g., paper, plastic, steel, aluminum, wood, gypsum board, or galvanized sheeting (either primed or unprimed). The type of surface, substrate or article to be coated generally determines the type of coating composition used. The coating composition may be applied using means known in the art. For example, a coating composition may be applied by spraying or by coating a substrate. In general, the coating may be dried by heating, but preferably is allowed to air dry.

The coating composition contains the surfactantless latex composition of the invention, and may further contain water, a solvent, a pigment (organic or inorganic) and/or other additives or fillers known in the art. Such additives or fillers, include, but are not limited to, leveling, rheology, and flow control agents such as silicones, fluorocarbons, urethanes, or cellulosics, extenders, reactive coalescing aids such as those described in U.S. Pat. No. 5,349,026, flatting agents, pigment wetting and dispersing agents, ultraviolet absorbers, ultraviolet light stabilizers, tinting pigments, extenders, defoaming and antifoaming agents, anti-settling, anti-sag and bodying agents, anti-skinning agents, anti-flooding and anti-floating agents, fungicides and mildewcides, corrosion inhibitors, thickening agents, plasticizers, reactive plasticizers, curing agents or coalescing agents. Specific examples of such additives can be found in *Raw Materials Index*, published by the National Paint & Coatings Association, 1500 Rhode Island Avenue, NW, Washington, D.C. 20005, U.S.A.

The surfactantless latex compositions of the present invention can be utilized alone or in conjunction with other conventional polymers. Such polymers include, but are not limited to, polyesters, such as terephthalate based polymers; polyesteranides; cellulose esters; alkyds; polyurethanes;

polycarbonates; epoxy resins; polyamides; acrylics; vinyl polymers; styrene-butadiene polymers; vinylacetate-ethylene copolymers; or a mixture thereof.

The surfactantless latex compositions of the invention may be useful as reactants in condensation polymerization reactions. As reactants in condensation polymerization reactions, the surfactantless latex compositions of this invention can be used to modify thermoplastic condensation polymers by co-reacting the surfactantless latex compositions with diacids, diisocyanates, and dialkyl, diaryl- or dihalo-carbonates. Section II below, describes, as one of its embodiments, such a use of the surfactantless latex composition as a reactant in a condensation polymerization reaction. In addition, the invention can act as a convenient delivery method to deliver the latex polymer into the thermoplastic condensation polymer.

II. Modified Condensation Polymer Blend

In a second major aspect, the invention concerns the introduction of a surfactantless latex composition into a reaction that forms a condensation polymer, which can result in a product having latex polymer particles entrapped in a condensation polymer matrix. The resulting condensation polymer may include the latex polymer particles derived from the surfactantless latex compositions, wherein the latex polymer particles may be dispersed in the condensation polymer continuous phase, so as to form a latex/condensation polymer blend. In a further aspect, the condensation polymer may be incorporated into a latex polymer matrix. The surfactantless latex compositions utilized in this aspect of the invention may comprise the compositions set forth and described in Section I above. With this invention, polymer blends with improved physical properties are provided. For example, if the latex polymer particles comprise a low Tg rubber and the condensation polymer is a polyester, such as poly(ethylene terephthalate) (PET), the resulting condensation polymer blend can exhibit improved impact resistance.

The latex polymer particles suitable for use in the surfactantless latex compositions may comprise the same polymers made from the ethylenically unsaturated monomers as those described in connection with the surfactantless latex compositions described in Section I, above, and may be functionalized or crosslinked in the same manner as that disclosed for the latex polymers of Section I. If functionalized, the functional groups may include groups capable of reacting with a diacid, diisocyanate, diarylcarbonate, dialkylcarbonate, dihalocarbonate, or a diol component. These functional groups may include, but are not limited to, epoxy, acid, hydroxyl, isocyanate, amine, amide, and carbonate groups or a mixture thereof.

In one aspect, the latex polymer particles comprise a non core-shell or a core-shell polymer, and comprise from about 50 to about 100%, or about 70 to about 100%, or from about 80 to about 100% of the residues of one of the following monomers: 2-ethyl hexyl acrylate, butyl acrylate, isoprene, styrene, butadiene, or acrylonitrile.

As used herein, the term "condensation polymerization" refers to condensation polymerization reactions and "condensation polymer" is the product thereof. The term "condensation polymerization" as used herein is also used to refer more generally to polymerization reactions of the step-growth-type. As used herein, the term "condensation polymer" is synonymous with "step-growth polymer."

For any of the emulsion, suspension, dispersion polymerized polymers or the mechanically emulsified surfactantless latex compositions to be introduced into the condensation reaction, the solvent or continuous phase may comprise water, diol, polyol, or a mixture thereof.

In one aspect, the continuous phase comprises at least some diol, so that the diols in the continuous phase of the surfactantless latex compositions may participate in the condensation polymerization reaction. In a further aspect, the surfactantless latex compositions comprise the surfactantless latex compositions described in Section I, above. In a separate aspect, the diol component of the sulfo-polyester may or may not participate in the condensation polymerization reaction. In a further separate aspect, the diol latex compositions utilized in the condensation polymerization reaction may have no diol.

In the surfactantless latex compositions comprising a diol-based continuous phase, the diols in the continuous phase can co-react with the diacids, diisocyanates, dialkyl or diaryl or dihalo carbonates, or mixtures thereof that comprise the reaction medium which forms the condensation polymer. In this aspect, suitable diol components for the diol-based continuous phase of the surfactantless latex compositions include, but are not limited to, the diol components described above in Section I.

In one aspect, the diol component may be present in at least one of the continuous phase, the condensation polymerization reaction medium or the sulfo-polyester. In this context, the diol component present on the sulfo-polyester comprises at least one diol moiety present on the sulfo-polyester, whereas the diol component of the continuous phase and/or the condensation polymerization reaction medium may comprise at least one diol compound, such as those described in Section I above. The diol concentration present in the condensation polymer reaction medium may be adjusted to account for the diol concentration in the surfactantless latex compositions.

The surfactantless latex compositions may be introduced into the condensation polymerization at various stages of the reaction. For example, in a poly(ethylene terephthalate) (PET) polymerization, dimethyl terephthalate (DMT), ethylene diol (EG) and catalyst metal are placed in a flask and polymerized. The latex composition can be added: 1) up front, i.e., with the other materials at the start; 2) after the other starting materials have melted and formed a homogeneous system; 3) after the DMT and EG have reacted in the first stage and given off MeOH; 4) right before $N_2$ is turned off and vacuum applied; 5) sometime during the final polycondensation phase, or anywhere in between, i.e., during the ester exchange phase.

Alternatively, the surfactantless latex composition may be blended into the fully or partially formed condensation polymer directly in an extruder at temperatures from about 200 to about 320° C. In this process, since the surfactantless latex composition is added directly to the condensation polymer, there is no need to harvest the latex polymer from the surfactantless latex composition. This can provide a more economical process over those of the prior art.

The final polymer blend can be affected by the time the surfactantless latex composition is added to the condensation polymer reaction. While not wishing to be bound by any mechanism, it is understood that the size and shape of the latex polymer in the condensation polymer matrix can be affected by the time of the addition. Also, particular chemical interaction between latex polymers and condensation polymers are affected by time of addition, and they, in consequence, can affect final blend properties.

In a further aspect, the surfactantless latex compositions may be introduced into the condensation polymerization at various stages of a glycolysis reaction. In such a process, a polyester, copolyester, polyesteramides or polycarbonates can be reduced in molecular weight by the addition of a glycol. This reaction takes place very rapidly at temperatures of about 200 to about 300° C., preferably at temperatures of about 240 to about 280° C.

The final blend can be affected by the time the latex is added to the glycolyzed polymer. For example, in the glycolysis of poly(ethylene terephthalate) (PET), the latex can be added after very little molecular weight reduction (from for example 0.7 IhV. to 0.6 IhV.), e.g., early in the glycolysis reaction, or after significant molecular weight reduction (from for example 0.7 IhV. to 0.05 IhV.), e.g., later in the glycolysis reaction. The final blend can be affected by the time at which the latex is added to the glycolyzed polymer. While not wishing to be bound by any mechanism, it is believed that the size and shape of the latex polymer in the condensation polymer matrix can be affected by the time of the addition. Also, particular chemical interaction between latex polymers and condensation polymers are affected by time of addition, and they, in consequence, can affect final blend properties.

When glycolyzed polymers, e.g., polyesters, are utilized in this invention, the glycolysis may take place rapidly in the presence of a glycol. Glycolysis temperatures can range from about 200° C. to about 300° C., preferably from 240° C. to 280° C. The glycols that can be used for this process are set out previously in the list of diols and are preferably ethylene glycol, butane diol, hexane diol and the like. In one aspect, the glycol comprises from about 10 to about 50% by weight based upon the total weight of the continuous phase, or from about 10 to about 75% by weight based upon the total weight of the continuous phase, or from about 10 to about 95% by weight of the continuous phase. After glycolysis and addition of the surfactantless latex composition, the molecular weight of the condensation polymer is normally increased by the addition of high vacuum (e.g., <10 mm of Hg) in order to produce, for example, a high molecular weight polyester.

In a further aspect, the diols that may be utilized in the glycolysis include, but are not limited to, any aliphatic or cycloaliphatic diol having from about 2 to about 10 carbon atoms; or a mixture thereof. Diols may include ethylene diol; 1,3-trimethylene diol; propylene diol; 1,4-butanediol; 1,5-pentanediol; 1,6-hexanediol; 1,7-heptanediol; 1,8-octanediol; 1,9-nonanediol; neopentyl diol; cis- or trans-cyclohexanedimethanol; cis- or trans-2,2,4,4-tetramethyl-1,3-cyclobutanediol; diethylene diol; 2,2,4-trurethyl-1,3-pentanediol; 2-methyl-1,3-propanediol; 2-methyl-1,3-pentanediol; or a mixture thereof. Additional diols include ethylene diol; propylene diol; 1,4-butanediol; diethylene diol; neopentyl diol; cis and trans-cyclohexanedimethanol; or a mixture thereof. Even more diols may include neopentyl diol; ethylene diol; cis or trans cyclohexanedimethanol; 1,4 butanediol; or a mixture thereof.

The process of the invention normally does not require the isolation of the polymer in the surfactantless latex compositions prior to addition to the condensation polymerization reaction. Thus, in one embodiment, the present invention may overcome the necessity of preparing a core-shell polymer or the necessity of harvesting the latex polymer from the emulsion. Further, since blending takes place during the condensation polymer preparation, there is no need for a polymer/polymer post blending step that is energy intensive, expensive and often leads to the reduction of the molecular weight of the final condensation polymer.

In some instances it may be desirable to utilize a surfactantless latex composition comprising a core-shell polymer in the condensation polymerization reaction. For example, when core-shell polymers are utilized herein, transparent blends can be produced. Such blends may be obtained by coordinating or by closely matching the refractive indices of the core-shell polymer with that of the condensation polymer matrix. Such techniques are described generally in U.S. Pat. No. 5,409,967, the disclosure of which is incorporated herein by this reference in its entirety.

In a further aspect, the reaction medium in which the surfactantless latex compositions of the invention are introduced forms polyester polymers. The term "polyester," as used herein, refers to any unit-type of polyester falling within the scope of the polyester portion of the blend, including, but not limited to, homopolyesters and copolyesters (two or more types of acid and/or diol residues of monomeric units). The polyesters of the present invention comprise an acid residue and a diol residue. The acid residues of the polyesters of the present invention total 100 mol % and the diol residues of the polyesters of the present invention total 100 mol %. It should be understood that use of the corresponding derivatives, specifically acid anhydrides, esters and acid chlorides of these acids is included throughout the application in the term "acid residue." In addition to the acid residue and the diol residue, the polyester may comprise other modifying residues. These modifying residues include, but are not limited to, a diamine, which would result in a polyester/amide.

In one aspect, the sulfo-polyesters co-react in the condensation polymerization reaction and, therefore, become partially or fully combined with the condensation polymer backbone. In a further aspect, the sulfo-polyesters do not co-react in the condensation polymerization reaction and, thus, do not become partially or fully combined into the condensation polymer backbone.

The polyesters can comprise residues of dicarboxylic acids or esters, including, but not limited to, aromatic dicarboxylic acid or ester residues, preferably having from about 8 to about 14 carbon atoms, alphatic dicarboxylic acid or ester residues, having from about 4 to about 12 carbon atoms, or cycloaphatic dicarboxylic acid or ester residues, having from about 8 to about 12 carbon atoms. The acid or ester residues that comprise the acid moiety of the polyester may include residues of phthalic acid; terephthalic acid; naphthalenedicarboxylic acid; isophthalic acid; cyclohexanediacetic acid; diphenyl 4,4'-dicarboxylic acid; succinic acid; glutaric acid; adipic acid; fumaric acid; azelaic acid; resorcinoldiacetic acid; didiolic acid; 4,4'-oxybis(benzoic) acid; biphenyldicarboxylic acid; 1,12-dodecanedicarboxylic acid; 4,4'-sulfonyldibenzoic acid; 4,4'-methyldibenzoic acid; trans 4,4'-stilbenedicarboxylic acid; 1,2-, 1,3-, and 1,4-cyclohexanedicarboxylic acids; and mixtures thereof. The polyester may be prepared from one or more of the above dicarboxylic acids.

Examples of dicarboxylic acids or derivatives used to prepare the polyester are terephthalic acid or ester and 2,6-napthalenedicarboxylic acid or ester, succinic, isophthalic, 1,4-cyclohexane dicarboxylic acid, glutaric, adipic acid or ester. Other naphthalenedicarboxylic acids or their esters may also be used. These include the 1,2-; 1,3-; 1,4-; 1,5-; 1,6-; 1,7-; 1,8-; 2,3-; 2,4-; 2,5-; 2,6-; 2,7-; and 2,8-naphthalenedicarboxylic acids, and mixtures thereof.

The diol component of the polyester comprises residues of diols that may be selected from cycloaliphatic diols having from about 6 to about 20 carbon atoms or aliphatic diols from about 2 to about 20 carbon atoms. Examples of such diols include ethylene diol; diethylene diol; triethylene diol; neopentyl diol; 1,4 butanediol; 1,6 hexanediol; 1,2-cyclohexanedimethanol; 1,3-cyclohexanedimethanol; 1,4-cyclohexanedimethanol; 1,3-propanediol; 1,10-decanediol; 2,2,4,4,-tetramethyl-1,3-cyclobutanediol; 3-methyl-2,4-pentanediol; 2-methyl-1,4-pentanediol; 2,2,4-trimethyl-1,3-pentanediol; 2-ethyl-1-1,3-hexanediol; 2,2-diethyl-1,3-propanediol; 1,3-hexanediol; 1,4-bis-(hydroxyethoxy) benzene; 2,2-bis-(4-hydroxycyclohexyl)-propane; 2,4-dihydroxy-1,1,3,3-tetramethylcyclobutane; 2,2-bis-(3-hydroxyethoxyphenyl)propane; 2,2-bis-(4-hydroxypropoxyphenyl)propane; or a mixture thereof. The diol component may be selected from ethylene diol; 1,4-butanediol; neopentyl diol; cyclohexanedimethanol; diethylene diol; or a mixture thereof. The diols may be modified with up to about 50 mol % or up to about 20 mol % of any of the other diols disclosed herein.

In one aspect, the polyesters of the invention may be essentially linear. However, these polyesters may also be modified with low levels of one or more branching agents. A branching agent is herein defined as a molecule that has at least three functional groups that can participate in a polyester forming reaction, such as hydroxyl, carboxylic acid, carboxylic ester, phosphorous-based ester (potentially trifunctional) and anhydride (difunctional).

Branching agents useful in preparing the polyester of the invention include, but are not limited to glycerol, pentaerythritol, trimethylol propane, trimellitic anhydride, pyromellitic dianhydride, tartaric acid, and mixtures thereof. If branching agents are used in the condensation reaction, a preferred range for the branching agent is from about 0.1 to about 2.0 weight %, or from about 0.2 to about 1.0 weight %, based on the total weight of the polyester.

Addition of branching agents at low levels does not generally have a significant detrimental effect on the physical properties of the polyester and cannot provide additional melt strength, which can be very useful in film extruding operations. High levels of branching agents may be incorporated in the copolyesters result in copolyesters with poor physical properties, for example low elongation.

The polymers of the invention may be buffered. Buffers can be utilized to control the formation of diethylene glycol, among other uses. Buffers may include, sodium acetate, potassium acetate, lithium acetate, sodium phosphate monobasic, potassium phosphate dibasic, sodium carbonate, and sodium bicarbonate. Buffering agents may be useful to limit the amount of acidic species which, in turn causes dehydration of the diols to give ether diol. Accordingly, it can be desirable to limit such acid species through the use of buffering agents.

An agent comprising one or more ion-containing monomers may be added to increase the melt viscosity of the polyesters. The ion-containing monomers useful in the invention, include, but are not limited to alkaline earth metal salts of sulfoisophthalic acid or a derivative thereof. A weight percentage for ion-containing monomers is from about 0.3 to about 5.0 mole %, or from about 0.3 to about 3.0 mole %. The ion containing monomers also increase the melt viscosity of the polyesters and do not reduce the elongation of the films to substantially low levels.

The homo or copolyesters of the invention may be prepared in a reaction carried out using diols and diacids (or diesters or anhydrides) at temperatures from about 150° C. to about 300° C. in the presence of polycondensation catalysts, including, but not limited to, titanium tetrachloride, titanium tetraisopropoxide, manganese diacetate, antimony oxide, antimony triacetate, dibutyl tin diacetate, zinc chloride, zinc diacetate, zinc acetate or a mixture thereof. The catalysts are typically employed in amounts between about 10 to about 1000 ppm, based on the total weight of the reactants. The final stage of the reaction is generally conducted under high vacuum (<10 mm of Hg) in order to produce a high molecular weight polyester.

The invention also relates to the modification, as discussed herein, of high molecular weight homo or copolyesters prepared by a method comprising the following steps:

(I) combining the diols and diacids as described herein, with a catalyst system, wherein the catalyst comprises Mn, Sb, Ti and other similar metallic species;

(II) in a first stage, heating said reaction mixture at from about 190° C. to about 220° C., at or slightly above atmospheric pressure; and (III) in a second stage adding a phosphorous based additive, heating the reaction mixture between about 220° C. and about 290° C. under a reduced pressure of about 0.05 to about 2.00 mm of Hg.

These polyesters may be prepared with one of the above named catalyst systems in the presence of a phosphorous-based additive. The concentration of catalyst in the reaction may be from about 5 to about 220 ppm, with the most preferred concentration being from about 20 to about 200 ppm. This reaction is best carried out in the two stages as described above.

In another aspect of the invention, a modified polycarbonate may be formed by introduction of the surfactantless latex composition into the reaction medium. The polycarbonates that may be modified, include, but are not limited to, homopolymers, copolymers and mixtures thereof that are prepared by reacting a dihydric phenol with a carbonate precursor. The dihydric phenols which may be used to produce the carbonate, include, but are not limited to bisphenol-A, (2,2-bis(4-hydroxyphenyl)propane); bis(4-hydroxyphenyl)methane; 2,2-bis(4-hydroxy-3-methylphenyl)propane; 4,4-bis(4-hydroxyphenyl heptane); 2,2-(3,5,3',5'-tetracliloro-4,4'-dihydroxydiphenyl)propane; 2,2-(3,5,3',5'-tetrabromo-4,4'dihydroxydiphenyl)propane; (3,3'-dichloro-4,4'-dihydroxydiphenyl) methane; or a mixture thereof. Branching agents that may be useful in preparing the polycarbonates of the invention include, but are not limited to glycerol, pentaerythritol, trimethylol propane, trimellitic anhydride, pyromellitic dianhydride, tartaric acid, and mixtures thereof. If branching agents are used in the condensation reaction, a range for the branching agent may be from about 0.1 to about 2.0 weight %, or from about 0.2 to about 1.0 weight %, based on the total weight of the polyester.

In another aspect of the invention, the thermoplastic condensation polymer to be modified by introduction of the surfactantless latex composition may comprise a polyurethane. The polyurethane that may be modified comprises residues of a diol or diols and residues of a di-isocyanante or diisocyanates. The diol residues of the polyurethane may be derived from diols including but not limited to, 1,3-cyclobutanediol; 1,3-cyclopentanediol; 1,2-cyclohexanediol; 1,3-cyclohexanediol; 1,4-cyclohexanediol; 2-cyclohexane-1,4-diol; 2-methyl-1,4-cyclohexanediol; 2-ethyl-1,4 cyclohexanediol; 1,3-cycloheptanediol; 1,4 cycloheptanediol; 2-methyl-1,4 cycloheptanediol; 4-methyl-1,3-cycloheptanediol; 1,3-cyclooctanediol; 1,4 cyclooctanediol; 1,5 cyclooctanediol; 5-methyl-1,4-cyclooctanediol; 5-ethyl-1,4-cyclooctanediol; 5-propyl-1,4 cyclooctanediol; 5-butyl ,1,4-cyclooctanediol; 5-hexyl-1,4-cyclooctanediol; 5-heptyl-1,4-cyclooctanediol; 5-octyl-1,4 cyclooctanediol; 4,4'methylenebis (cyclohexanol); 4,4'-methylenebis(2-methylcyclohexanol); 3,3'-methylenebis(cyclohexanol); 4,4'ethylenebis (cyclohexanol); 4,4'propylenebis(cyclohexanol); 4,4'butylenebis(cyclohexanol); 4,4'isopropylidenebis (cyclohexanol); 4,4'isobutylenebis(cyclohexanol); 4,4'dihydroxydicyclohexyl; 4,4'carbonylbis(cyclohexanol); 3,3'-carbonylbis(cyclohexanol); 4,4'sulfonylbis (cyclohexanol); 4,4'-oxybis(cyclohexanol); or a mixture thereof.

The polyurethanes of the invention can be prepared using any known methods for bringing together, in the presence or absence of solvents, polyisocyanates, extenders, and optionally, high molecular weight polyols. This includes manual or mechanical mixing means including casting, reaction extrusion, reaction injection molding and related processes. Typical preparative methods useful in the instant invention are disclosed in U.S. Pat. Nos. 4,376,834 and 4,567,236, incorporated herein by reference, whose disclosures relate to polyurethane plastic forming ingredients and preparative procedures.

The mixing of the reactants may be carried out at ambient temperature, i.e at a temperature from about 20° C. to about 25° C. The resulting mixture is may be heated to a temperature from about 40° C. to about 130° C., or from about 50° C. to about 100° C.; one or more of the reactants may be heated to a temperature within these ranges before admixing.

A catalyst may optionally be included in the reaction mixture that is used to prepare the polyurethanes. Any of the catalysts conventionally employed in the art to catalyze the reaction of an isocyanate with a reactive hydrogen containing compound may be used for this purpose. Suitable catalysts are disclosed in U.S. Pat. No. 4,202,957 at column 5, lines 45 to 67, incorporated herein by this reference. The amount of catalyst used is preferably within the range of about 0.02 to about 2.0 percent by weight, based on the total weight of the reactants. In a particular aspect of the one-shot procedure, the reaction is carried out on a continuous basis using apparatus and procedures such as that disclosed in U.S. Pat. No. 3,642,964, the disclosure of which is herein incorporated in its entirety by this reference.

The polyurethanes of this invention include both thermoplastic injection-moldable and thermoset resins. The thermoplastic resins are obtained by employing substantially difunctional polyisocyanates and difunctional extenders, and a polyol having a functionality preferably not exceeding 4, although polyols having higher functionalities may be employed where the weigh proportion used in a low range. As will be recognized by one skilled in the art, this limit will vary according to the nature of the polyol, the molecular weight of the polyol, and the amount of polyol used. In general, the higher the molecular weight of the polyol, the higher the functionality that can be employed without losing the thermoplastic properties in the polyurethane product.

The diisocyanante residue may be derived from diisocyanates, including, but not limited to methylenebis (phenyl isocyanate) including the 4,4'-isomer, the 2,4'isomer and mixtures thereof, m-and p-phenylene diisocyanates, chlorophenylene diisocyanates, α,β-xylene diisocyanate, 2,4- and 2,6-toluene diisocyanates and mixtures of these latter two isomers, tolidine diisocyanate, hexamethylene diisocyanate, 1,5-naphthalene diisocyante, isophorone diisocyanate and the like, cycloaliphatic diisocyanates such as methylenebis(cyclohexyl isocyanate) including the 4,4'isomer, the 2,4'isomer and mixtures thereof, and all the geometric isomers thereof including trans/trans, cis/trans, cis/cis and mixtures thereof, cyclohexylene diisocyanantes (1,2, 1,3 or 1,4-), 1-methyl-2,5-cyclohexylene diisocyanate, 1-methyl-2,4 cyclohexylene diisocyante, 1-methyl-2,6-cyclohexyl diisocyanate, 4,4'-isopropylidenebis(cyclohexyl isocyanate), 4,4'-diisocyanatodicyclohexyl and all geometric isomers and mixtures thereof. Also included are the modified forms of methylenebis(phenylisocyanate). By the latter are meant those forms of methylenebis(phenyl isocyanate) which have been treated to render them stable liquids at ambient temperature. Such products include those which have been reacted with a minor amount (up to about 0.2 equivalents per equivalent of polyisocyanate) of an aliphatic diol or a mixture of aliphatic diols such as the modified methylenebis(phenyl isocyanates) described in U.S. Pat. Nos. 3,394,164; 3,644,457; 3,883,571; 4,031,026; 4,115,429; 4,118,411; and 4,299,347. The disclosure of each of these referenced applications are herein incorporated in their entireties.

The modified methylenebis(phenyl isocyanates) also include those which have been treated so as to convert a minor proportion of the diisocyanate to the corresponding carbodiimide which then interacts with further diisocyanate to form the aeration-imine groups, the resulting product being a stable liquid at ambient temperatures as described, for example, in U.S. Pat. No. 3,384,653, the disclosure of which is herein incorporated in its entirety by this reference. Mixtures of any of the above-named polyisocyanates can be employed if desired. Further in the case of the preparation of those polyurethanes of the invention which are thermoset, it is possible to introduce into the polyisocyanate component employed in the reaction, minor amounts (up to about 30 percent by weight) of polymethylene polyphenyl polyisocyanates. The latter are mixtures containing from about 20 to about 90 percent by weight of methylenebis(phenyl isocyanate) the remainder of the mixture being polymethylene polyphenyl polyisocyanates of functionality higher than about 2.0. Such polyisocyanates and methods for their preparation are well known in the art; for example, U.S. Pat. Nos. 2,683,730; 2,950,263; 3,012,008 and 3,097,191. The disclosure of each of these patents are each incorporated herein by this reference. Branching agents useful in preparing the polyurethanes of the invention include, but are not limited to glycerol, pentaerythritol, trimethylol propane, trimellitic anhydride, pyromellitic dianhydride, tartaric acid, and mixtures thereof. If branching agents are used in the condensation reaction, a range for the branching agent may be from about 0.1 to about 2.0 weight %, or from about 0.2 to about 1.0 weight %, based on the total weight of the polymer.

When the condensation polymer is a polyurethane and the surfactantless latex compositions comprise a rubber component consisting of isoprene, chlioroprene, butadiene, SBR (styrenelbutadiene rubber), isobutene, isoprene or EPDM, the resulting latex/condensation polymer blend may have an equilibrium water absorption of less than about 10% by weight.

In one aspect, the latex polymer is dispersed in the condensation polymer matrix. In a further aspect, the condensation polymer is dispersed in the latex polymer matrix.

Other ingredients may optionally be added to the compositions of the present invention to enhance the performance properties of the latex/condensation polymer matrix. For example, surface lubricants, stabilizers, antioxidants, ultraviolet light absorbing agents, mold release agents, metal deactivators, colorants such as black iron oxide and carbon black, nucleating agents, phosphate stabilizers, zeolites, fillers, reinforcing agents, mixtures thereof, and the like, can be included herein. All of these additives and the use thereof are well known in the art. Any of these compounds can be used so long as they do not hinder the present invention from accomplishing its objects.

In a further aspect relating to the addition of reinforcing agents to the compositions of the present invention, glass fibers may be added to the condensation polymer compositions to provide particular advantages to the resulting compositions. Glass fibers that may be utilized in the present invention conventionally have an average standard diameter of greater than about 5 microns, with a range of from about 10 to about 20 microns. The length of the glass filaments whether or not they are bundled into fibers, and whether the fibers are further bundled into yarns, ropes or rovings, and the like, are not critical to this invention. However, for the purpose of preparing the present compositions, filamentous glass in the form of chopped strands of from about 1.5 mm to about 10 mm long or from less than about 6 mm long may be utilized. In the pellets and molded articles of the compositions, even shorter lengths will be encountered, because during compounding, considerable fragmentation occurs. This is, however, desirable because the best properties are exhibited for injection molded articles where the filament lengths are between about 0.03 mm and about 1 mm. Especially useful are glass fibers having an average standard diameter in the range of greater than about 5, preferably about 5 to about 14, and the average filament length dispersed in the molded articles being between from about 0.15 and about 0.4 nm. Consequently, glass filaments may be dispersed more uniformly and the molded articles may exhibit uniform and balanced mechanical properties, especially surface smoothness.

The amount of the glass fibers can vary broadly from about 10 to about 50% by weight, or from about 10 to about 40% by weight, based on the total polymer composition. These glass fibers are typically conventionally sized with coupling agents, such as aminosilanes and epoxysilanes and titanates, and adhesion promoters such as epoxies, urethanes, cellulosics, starch, cyanurates, and the like.

In one aspect, when the glass fiber is present in the polymer molding composition, the polymer may be from about 70 to about 85% by weight of the total composition based on the total weight percentages of the condensation polymer and the latex polymer equaling 100%. The polymer in the polymer molding composition may comprise a polyester.

Examples of other reinforcing agents that are useful in addition to glass fibers, include, but are not limited to, carbon fibers, mica, clay, talc, wollastonite, calcium carbonate or a combination thereof. The polymer compositions of the invention may be reinforced with a mixture of glass and other reinforcing agents as described above, such as mica or talc, and/or with other additives.

In accordance with the invention herein, the surfactantless latex compositions and glass fibers, as well as other reinforcing agents, may be introduced into the condensation polymerization reaction at various stages of the process. In one aspect, the glass fibers may be added directly to the condensation polymerization reaction. Since the glass fibers can be sufficiently blended during this stage, there is no need for a post-blending step, such as extrusion, to incorporate the glass fibers into the compositions. This may be particularly advantageous to the present invention because a post-blending step is energy intensive, expensive and may often cause a reduction in the molecular weight of the condensation polymer.

End-use applications for the compositions of the condensation polymers produced according to the instant invention include impact-modified polymers, elastomers, high barrier films and coatings, improved barrier polymers, and polymers having improved mechanical properties, such as improved tensile strength, improved elongation at break, better weathering properties, improved heat deflection temperatures and improved flexural strength Other end-use applications include engineering resins, coatings, containers for barrier applications and molding plastics. In addition, powder coatings may be produced from the modified condensation polymers produced according to the invention. The polymers produced by this invention are useful for thermoplastic engineering resins, elastomers, films, sheets and container plastics.

In a further aspect, an impact modified polyester is prepared comprising a core-shell or a non core-shell latex polymer derived from a surfactantless latex composition. In another aspect, a hydroxyl fanctionalized polyester coating is prepared comprising a core-shell or a non core-shell latex polymer derived from a surfactantless latex composition.

In another aspect, a latex/condensation polymer blend which is transparent or semi-transparent is formed. As noted previously, such polymers may be formed by closely matching the refractive index of a polymer utilized as the latex polymer with the refractive index of the condensation polymer matrix. The polymer blends of the invention are also preferably generally opaque.

In another aspect of the invention, a modified condensation polymer, including, but not limited to, an impact modified plastic, is produced from a surfactantless latex compositions comprising latex polymers which are core-shell or non core-shell polymers, and a condensation polymer. The latex polymer of the surfactantless latex compositions in this aspect has a Tg of less than about 40° C., while the condensation polymer has a Tg of greater than about 40° C. The impact modified plastic may be prepared from a surfactantless latex composition comprising a latex polymer which comprises residues of butyl acrylate; isoprene; butadiene; lauryl acrylate; acrylonitrile; vinylidene chloride; or a mixture thereof.

In another aspect of the invention, a modified condensation polymer, including but not limited to, a thermoplastic elastomer, is produced from a surfactantless latex composition comprising latex polymers which are non core-shell polymers. The latex polymer in this aspect has a Tg greater than about 40° C., and the condensation polymer has a Tg less than about 40° C. The condensation polymer may have a Tg of less than about 0° C. and essentially no crystallinity, or the condensation polymer will have a Tg of less than about −20° C. and will have essentially no crystallinity. In a further aspect, both the latex polymer and the condensation polymer will have Tg's of less than about 40° C. The thermoplastic elastomer may be prepared from a surfactantless latex composition comprising a latex polymer comprising residues of vinyl chloride; styrene; α-methyl styrene; methyl methacrylate; vinyl naphthalene; isobornyl methacrylate; or a mixture thereof.

In another aspect of the invention, a modified condensation polymer, including but not limited to, a thermoplastic elastomer, is produced from a surfactantless latex composition comprising a latex polymer which is a core-shell polymer. The latex polymer in this aspect has a Tg greater than about 40° C., and the condensation polymer has a Tg less than about 40° C. The condensation polymer may have a Tg of less than about 0° C. and essentially no crystallinity or the condensation polymer will have a Tg of less than about −20° C. and will have essentially no crystallinity. In a further aspect, both the latex polymer and the condensation polymer will have Tg's of less than about 40° C. The thermoplastic elastomer may be prepared from a surfactant-less latex composition comprising a latex polymer of a core-shell type.

Elastomers are finding increasing utility, in particular thermoplastic elastomers (TPE's) that are elastomeric at use temperature, but can be processed as a plastic (e.g., injection molding, extruded) at appropriate temperatures. In a further aspect of this invention, an elastomer may be prepared according to the processes of the invention. For example, a condensation polymer that is amorphous and has a low Tg may be a viscous fluid that is not useful as a plastic or elastomer. This low Tg viscous polymer may be used to make an elastomer by adding a second polymer, in the form of a surfactantless latex composition, which acts as a physical cross-linker and is a tie-point for the viscous polymer chains. A phase separated polymer blend will result that has elastomeric properties.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

The materials and testing procedures used for the results shown herein are as follows:

Inherent viscosity (I.V.) was determined at 25° C. with a 0.25 gram sample in 50 mL of 60/40 by weight solution of phenol/tetrachloroethane.

Molecular weight distributions were determined by gel permeation chromatography (GPC). Solutions were made by dissolving about 4 mg of polymer in a 5/95 by weight solution of hexafluoroisopropanol/methylene chloride containing 10% by volume toluene as a flow rate marker. The system was calibrated using a series of narrow molecular weight polystyrene standards. The molecular weights were reported in absolute molecular weight values determined from a set of Mark-Houwink constants that relate PET to polystyrene.

Thermal transitions were determined by differential scanning calorimetry (DSC) on a DuPont instruments 2200 DSC. Percent crystallinity was also determined by DSC. DSC was performed using a scan rate of 20° C./minute after the sample was heated above its melting temperature and rapidly quenched below its glass transition temperature.

Films were prepared by compression molding the dried polymer. Drying was accomplished in a 120° C. vacuum oven (20 mm Hg) overnight. The dried polymers were compression molded at Tm+30 to 50° C. into a 6"×6" film by pressing between two metal plates with a 15 mil shim on a Pasadena Hydraulics Inc. press. Pressure was gradually applied for 2 minutes before ultimately reaching 15,000 ram force pounds and holding for 1 minute. After compression molding, the films were quickly dipped into an ice bath to quench. Instrumented impact testing of the films was done according to ASTM method D3763, High Speed Puncture Properties of Plastics Using Load and Displacement Sensors. Testing was done at 23° C. on a Ceast Fractovic testing machine. Film thickness ranged from 0.33–0.38 mm. Films were placed over a hole with a 76 mm insert diameter while the films were hit with a 0.5" diameter striker with a velocity of 11.1 ft/s. Failure was classified as brittle if the film shattered or fractured into pieces, while a ductile failure was reported if a hole was created in the film.

Transmission Electron Microscopy: Thin cross sections were made on a Cryo-Ultramicrotome operated at −105° C. The sections were examined in a Philips CM12 TEM operated at 80 kV. The contrast was natural without the use of stains.

Optical Microscopy: Thin cross sections were made at −60° C. and examined using a Zeiss light microscope.

The sulfo-polyester polymers utilized as stabilizers in the present invention were dispersed in glycols at about 40 to about 90° C. Sulfo-polyester polymer pellets were added slowly to the heated glycol under continuous stirring the liquid. A clear dispersion of the sulfo-polyester polymer was obtained at room temperature. These dispersions were used for preparing latexes in a glycol medium.

EXAMPLE—1

This example illustrates the process of preparing surfactantless latexes in diols and polyols. The low molecular weight sulfo-polyester E (25.0 g), as described in Table 1 above, was dispersed in ethylene glycol (225.0 g) under continuous stirring at a temperature range from 40–90° C. To a 1L jacketed reaction kettle equipped with a condenser, nitrogen purge, and stirrer, 250 g of ethylene diol containing 10.0 wt % of a low molecular weight sulfo-polyester polymer was added. The contents of the reactor were heated to 80° C. In a separate 500 ml flask, a monomer mixture containing 190.0 g of 2-ethylhexylacrylate and 10.0 g of butyl acrylate were prepared. In a separate container, 0.4 g of ammonium persulfate, used as an initiator, was dissolved in 50 g of ethylene diol at about 20–50° C. To the heated reactor, the monomer mixture and initiator were pumped separately over a period of 2.0–3.0 hours. After allowing the contents of the reactor to re-equilibrate (about a few minutes) the reactor appearance changed from clear to a bluish-white tint indicating the formation of small particles. The remaining monomer mixture and initiator were continuously fed into the reactor. After all the monomer was added, the reaction was held at 80° C. for an additional hour at which point the reactor was cooled to room temperature.

The resulting latex was filtered through a multi-layered cheese-cloth. The latex was evaluated for solids content using a Computrac at 200.0° C. and an oven at 80.0° C. to 100.0° C. The latex contained 44.56% solids by Computrac and 44.73% solids by oven drying method. The Tg of the dried latex polymer was −48.3° C. The average particle size of the acrylic latex in ethylene glycol was 90.8 mm The visual observations of latex samples under high magnification light microscopy indicate that the latex particle size was less than 250 nm; usually in the range of 100–250 nm. The pH of glycol-based latex was in the range of 2.7–2.9.

EXAMPLE—2

Example 1 was repeated with the exception that 5/95 ratio of 2-ethylhexylacrylate (2-EHA) and butyl acrylate (BA) monomers were used instead of 95/5 ratio of 2-ethylhexylacrylate and butyl acrylate in preparing latexes in ethylene diol.

The resulting latex was filtered through a multi-layered cheese-cloth The latex was evaluated for solids content using a Computrac at 200.0° C. and an oven at 80.0° C. to 100.0° C. The material contained 44.64% solids by Computrac and 43.8% solids by oven drying method. The Tg of the dried latex polymer was −44.2° C. Molecular weight (Mw) of the latex polymer was 767,575 with polydispersity of 49.155.

The visual observations of latex samples under high magnification light microscopy indicate that the latex particle size was less than 250 nm; usually in the range of 100–250 nm. The pH of glycol-based latex was in the range of 2.7–2.9.

EXAMPLE—3

Example 1 was repeated with the exception that a 50/50 ratio of methyl methacrylate (MMA) and butyl acrylate (BA) monomers were used instead of a 95/5 ratio of 2-ethylhexylacrylate and butyl acrylate in preparing latexes in ethylene diol.

The resulting latex was filtered through a multi-layered cheese-cloth. The latex was evaluated for solids content using a Computrac at 200.0° C. and an oven at 80.0° C. to 100.0° C. The material contained 49.63% solids by Computrac and 44.2% solids by oven drying method. The Tg of the dried latex polymer was 14.47° C. Molecular weight (Mw) of the latex polymer was 944,798 with polydispersity of 17.331.

The visual observations of latex samples under high magnification light microscopy indicate that the latex particle size was less than 250 nm; usually in the range of 100–250 nm. The pH of glycol-based latex was in the range of 2.7–2.9.

EXAMPLE—4

Example 1 was repeated with the exception that a 25/75 ratio of methyl methacrylate (MMA) and butyl acrylate (BA) monomers were used instead of a 95/5 ratio of 2-ethylhexylacrylate and butyl acrylate in preparing latexes in ethylene diol.

The resulting latex was filtered through a multi-layered cheese-cloth. The latex was evaluated for solids content using a Computrac at 200.0° C. and an oven at 80.0° C. to 100° C. The material contained 37.13% solids by Computrac and 37.14% solids by oven drying method. The Tg of the dried latex polymer was −22.01° C. Molecular weight (Mw) of the latex polymer was 477,223 with polydispersity of 15.692.

The visual observations of latex samples under high magnification light microscopy medicate that the latex particle size was less than 250 nm; usually in the range of 100–250 nm. The pH of glycol-based latex was in the range of 2.7–2.9.

EXAMPLE—5

Example 1 was repeated with the exception that the ratio of methyl methacrylate (MMA)/butyle acrylate (BA) monomer was 10/90 instead of a 95/5 ratio of 2-ethylhexylacrylate and butyl acrylate in preparing latexes in ethylene diol.

The resulting latex was filtered through a multi-layered cheese-cloth. The latex was evaluated for solids content using a Computrac at 200.0° C. and an oven at 80.0° C. to 100.0° C. The dried material contained 24.81% solids by Computrac and 27.56% solids by oven drying method. The Tg of the dried latex polymer was −34.37° C. Molecular weight (Mw) of the latex polymer was 525,591 with polydispersity of 14.029.

The visual observations of latex samples under high magnification light microscopy indicate that the latex particle size was less than 250 nm; usually in the range of 100–250 nm. The pH of glycol-based latex was in the range of 2.7–2.9.

EXAMPLE—6

Example 1 was repeated with the exception that the pH of the latexes was 6.5 instead of 2.9. The pH of the latex prepared according to Example 1 was raised by using sodium bicarbonate solution in ethylene glycol. The solution of sodium bicarbonate in ethylene glycol was prepared at about 30 to 60° C. under continuous stirring the material.

The resulting latex was filtered through a multi-layered cheese-cloth. The latex was evaluated for solids content using a Computrac at 200.0° C. and an oven at 80.0° C. to 100.0° C. The dried material contained 37.93% solids by Computrac. The Tg of the dried latex polymer was −21.66° C. Molecular weight (Mw) of the latex polymer was 648,400 with polydispersity of 2.699.

The visual observations of latex samples under high magnification light microscopy indicate that the latex particle size was less than 250 nm; usually in the range of 100–250 nm. The pH of glycol-based latex was in the range of 6.4–6.7.

EXAMPLE—7

Example 1 was repeated with the exception that the 2-ethylhexylacrylate (2-EHA) monomer was used instead of a 95/5 ratio of 2-ethylhexylacrylate and butyl acrylate in preparing latexes in ethylene diol.

The resulting latex was filtered through a multi-layered cheese-cloth. The latex was evaluated for solids content using a Computrac at 200.0° C. and an oven at 80.0° C. to 100.0° C. The dried material contained 31.31% solids by Computrac and 33.52% solids by oven drying method. The Tg of the dried latex polymer was −67.04° C. Molecular weight (Mw) of the latex polymer was 559,870 with polydispersity of 9.664.

The visual observations of latex samples under high magnification light microscopy indicate that the latex particle size was less than 250 nm; usually in the range of 100–250 nm. The pH of glycol-based latex was in the range of 6.4–6.8.

EXAMPLE—8

Example 7 was repeated with the exception that the pH of the latexes was 6.5 instead of 2.9. The pH of the latex prepared according to Example 1 was raised by using sodium bicarbonate solution in ethylene glycol. The solution of sodium bicarbonate in ethylene glycol was prepared at about 30 to 60° C. under continuous stirring the material.

The resulting latex was filtered through a multi-layered cheese-cloth. The latex was evaluated for solids content using a Computrac at 200.0° C. and an oven at 80.0° C. to 100.0° C. The dried material contained 31.0% solids by Computrac and 28.90% solids by oven drying method. The Tg of the dried latex polymer was −68.58° C. Molecular weight (Mw) of the latex polymer was 565,981 with polydispersity of 4.362.

The visual observations of latex samples under high magnification light microscopy indicate that the latex particle size was less than 250 nm; usually in the range of 100–250 nm. The pH of glycol-based latex was in the range of 6.4–6.8.

EXAMPLE—9

Example 7 was repeated with the exception that sulfopolyester C in ethylene glycol was used instead of sulfopolyester E (these dispersions are described above in Table 1) in preparing latexes in ethylene diol in accordance with the procedure described in Example 1. The initiator, ammonium persulfate used in the reaction was 0.25 g instead of 0.40 g.

The resulting latex was filtered through a multi-layered cheese-cloth. The latex was evaluated for solids content using a Computrac at 200.0° C. and an oven at 80.0° C. to 100.0° C. The dried material contained 32.04% solids as measured by Computrac. The Tg of the dried latex polymer was −64.88° C. The molecular weight (Mw) of the latex polymer was 302,937 with a polydispersity of 7.434.

The visual observations of latex samples under high magnification light microscopy indicate that the latex particle size was less than 250 nm; usually in the range of 100–250 nm. The pH of glycol-based latex was in the range of 2.7–2.9.

EXAMPLE—10

Example 7 was repeated with the exception that the diethylene glycol (DEG) was used instead of ethylene glycol in preparing latexes in ethylene diol in accordance with the procedure described in Example 1. The monomer, MMA, was used for preparing latexes in diethylene glycol.

The resulting latex was filtered through a multi-layered cheese-cloth. The latex was evaluated for solids content using a Computrac at 200.0° C. and an oven at 80.0° C. to 100.0° C. The dried material contained 35.06% solids by Computrac and 35.87% solids by oven drying method. The Tg of the dried latex polymer was 102.41° C. Molecular weight (Mw) of the latex polymer was 109,077 with polydispersity of 8.63.

The visual observations of latex samples under high magnification light microscopy indicate that the latex particle size was less than 250 nm; usually in the range of 100–250 nm. The pH of glycol-based latex was in the range of 2.7–2.9.

PREPARATION OF POLYESTER/ACRYLIC EMULSION BLENDS—EFFECT OF SURFACTANT FREE LATEX ON FOAM GENERATION IN POLY (1,4 CYCLOHEXYLENEDIMETHYLENE TEREPHTHALATE) (PCT)

EXAMPLE—11

PCT/5 wt % EHA/TMPTA Acrylic Emulsion in EG

Dimethyl Terephthalate (77.60 g., 0.4 moles, Cape Industries), 1,4 cyclohexanedimethanol (69.12 g., 0.48 moles, distilled grade), and Ti(iOPr)$_4$ catalyst solution (0.5 ml, 2.07% Ti (wt/vol)) were placed in a 500-ml 2-necked round bottom flask. The flask was equipped with a stainless steel stirrer, a polymer head for nitrogen inlet and volatiles removal, 2 dry ice traps with 2 round bottom flask receivers. A Heller stirrer/motor assembly was used for agitation and a Belmont metal bath with a Eurotherm controller were used as a heat control source. The flask and contents were placed under a nitrogen purge and then placed in a 200° C. molten metal bath. The temperature setting was immediately increased to 285–290° C. The material in the flask was stirred slowly until molten and the agitation then increased. Methanol was removed during the heat-up step. When the polymer bath temperature reached 290° C., acrylic emulsion from Example 4 above (15.54 g. of a 37.13% solids emulsion) was added dropwise over 10 minutes. There was some slight foam during addition, but not excessive. The system was held 10 minutes after all emulsion was added to allow the foam to completely subside before vacuum was applied. The system was placed under full vacuum in 2 minutes with no foam generation observed. After 43 minutes under full vacuum, a polymer with the following properties was obtained: I.V. of 0.80; $2^{nd}$ cycle $T_g$ of 89° C.; $2^{nd}$ cycle $T_m$ of 276° C.

EXAMPLE—12A

PCT/10 wt % Acrylic Emulsion in EG

Using a method identical to Example 11 a polymer was prepared with 10 wt % acrylic emulsion from Example 4 above (32.80 g. of a 37.13% solids emulsion). The emulsion was added over 10 minutes with some foam generation, but not excessive. The system was placed under full vacuum in 3 minutes with no foaming. After 49 minutes under full vacuum, a polymer with the following properties was obtained: I.V. of 0.592(insol); $2^{nd}$ cycle $T_g$ of 82.6° C.; $2^{nd}$ cycle $T_m$ of 265.6° C.

EXAMPLE—12B

Repeat of Example 12A

The emulsion added in 12 minutes with some foam, but not excessive. Full vacuum was achieved in 10 minutes; some difficulties found obtaining good vacuum, but no problems with foam. After 50 minutes under full vacuum, a polymer with the following properties was obtained: I.V. of 0.591(insol); $2^{nd}$ cycle $T_g$ of 83.3° C.; $2^{nd}$ cycle $T_m$ of 267° C.

EXAMPLE—13

PCT/5 Wt % Acrylic Emulsion in EG

Using a method identical to Example 11, 23.26 g of a 24.81% solids acrylic emulsion from Example 5 above was added dropwise to the reaction melt at 290° C. over 10 minutes. There was some foam generation during the addition step and the melt was held 10 minutes after all emulsion was added to allow foam to subside. Full vacuum was applied for 5 minutes with no foaming observed. After 43 minutes under full vacuum, a polymer with the following properties was obtained: I.V. of 0.785; $2^{nd}$ cycle $T_g$ of 80.1° C.; $2^{nd}$ cycle $T_m$ of 271.8° C.

EXAMPLE—14

Comparative Example

Preparation of PCT with Acrylic Emulsion in Ethylene Glycol (EG) using Conventional Surfactants The process was the same as described in Example 11 for preparing PCT/5 wt % EHA/TMPTA Acrylic Emulsion in EG (Henkel FES 77 Surfactant). Dimethyl Terephthalate (77.60 g., 0.4 moles, Cape Industries), 1,4 cyclohexanedimethanol (72.0 g., 0.5 moles, distilled grade), and Ti(iOPr)$_4$ catalyst solution (0.5 ml, 2.07% Ti (wt/vol)) were placed in a 500-ml 2-necked round bottom flask. The flask was equipped with a stainless steel stirrer, a polymer head for nitrogen inlet and volatiles removal, 2 dry ice traps with 2 round bottom flask receivers. A Heller stirrer/motor assembly was used for agitation and a Belmont metal bath with a Eurotherm controller were used as a heat control source. The flask and contents were placed under a nitrogen purge and then placed in a 200° C. molten metal bath. The temperature setting was immediately increased to 285–290° C. The material in the flask was stirred slowly until molten and the agitation then increased. Methanol was removed during the heat-up step. When the temperature reached 290° C. (~25 min), an EHM/TMPTA (95/5) acrylic emulsion in ethylene glycol (20.5 g. of a 30 wt % solids emulsion—Reference X-90, Henkel FES 77 surfactant) was added dropwise to the polymer/ester-exchange melt through an addition funnel in the side arm. There was a small amount of foam generation during addition. After all the emulsion was added (~25 min), the system was placed under vacuum ($\leq 1.0$ mm Hg) very slowly. Thirty minutes was need to achieve full vacuum as significant foaming occurred during the vacuum stage and polymer would have come over into the receiver if the vacuum had been put on faster. The polymer was held under full vacuum for 50 minutes. The final polymer had the following properties: I.V. of 0.65; $2^{nd}$ cycle $T_g$ of 82° C.; $2^{nd}$ cycle $T_m$ of 278.6° C.

EXAMPLE—15

Comparative Example

PCT/5 wt % EHA/TMPTA Acrylic Emulsion in EG

Another polymer was prepared under experimental conditions similar to Examples 11 and 14. The weights of the components were identical and the addition method of the acrylic was the same. The composition of the acrylic emulsion was the same as Ex. 1 but the surfactant was Hitenol A-10. During the addition phase there was some foam generation, but this was not excessive. The time to add all the emulsion was 7 minutes. Full vacuum was applied in 13 minutes, but there was a great deal of foam generation during the vacuum stage and some foam came up into the neck of the flask. The polymer was kept under full vacuum for 50 minutes. The final polymer had the following properties: I.V. of 0.953; $2^{nd}$ cycle $T_g$ of 84° C.; $2^{nd}$ cycle $T_m$ of 274° C.

EXAMPLE—16

Comparative Example

PCT/5 wt % EHA/STY/ALMA/MAA (4% MAA) Acrylic Emulsion in EG

A polymer was prepared under conditions similar to Examples 11, 14 and 15 except that a 0.5 mole run was prepared and a different acrylic emulsion was used. Dimethyl terephthalate (97.0 g., 0.5 moles), 1,4 cyclohexanedimethanol (86.4 g., 0.6 moles), and Ti(iOPr)$_4$ catalyst solution (0.65 ml) were used. EHA/STY/AL AA (81/10/5/4) acrylic emulsion in EG (Hitenol HS-20 surfactant). 24 g. of a 30 wt % solids emulsion was added dropwise to the molten reaction mixture over 25 minutes. There was foam generation during the addition step and the polymer was held an additional 14 minutes after all emulsion was added to allow foam reduction before vacuum was applied. The system was placed under vacuum very slowly to prevent excessive foam-total time to achieve full vacuum was 45 minutes and there was much foaming during this process. The system was held under full vacuum for 55 minutes. The properties of the final polymer were: I.V. of 0.733; $2^{nd}$ cycle $T_g$ of 88.7° C.; $2^{nd}$ cycle $T_m$ of 278.5° C.

Note: Because of excessive foaming, only 5 wt % acrylic was added to the above 3 polyesters. Additional examples using these types of acrylic emulsions in EG and various other experimental modes of addition of the acrylic emulsion to the polyester are shown in Table 2 as follows:

TABLE 2

T16/ACRYLIC EMULSION POLYMERS WITH 5 AND 10 WT % ACRYLIC

| Emulsion Composition | Wt % | I.V. | EG | DEG | TEG | COOH (eg/10$^6$) | Tg (° C.) | Tm (° C) | Addition Method | Comments |
|---|---|---|---|---|---|---|---|---|---|---|
| None | | .657 | — | — | — | 7.83 | 89.4 | 290 | | |
| None | | .694 | — | — | — | 8.06 | 89.8 | 288 | | |
| Sty/EHA/MA A (M) | 5 | — | — | — | — | — | — | — | Initially | No polymer-too much foam |
| Sty/ALMA/EH A/MAA (M) | " | .653 | 5.6 | .45 | .20 | 16.86 | 92.8 | 275 | Initially | DC 7 defoamer |
| Sty/ALMA/EH A/MAA (M) | " | .589 | 9.7 | .86 | .23 | 15.56 | 86.9 | 271 | Dropwise during heat temp | Major foam |
| EHA/TMPTA (M) | " | .786 | 18.2 | 1.14 | .12 | 12.78 | 79.2 | 268 | Dropwise at polymn temp | Foam |
| Sty/ALMA/EH A/MAA (M) | " | .733 | 2.11 | .44 | .18 | 10.71 | 88.7 | 278 | Dropwise at polymn temp | Foam |
| Sty/EHA/MA A (M) | " | .689 | 2.67 | .49 | .25 | 9.73 | 87.6 | 278 | Dropwise at polymn temp | Not as much foam |
| EHA/TMPTA (M) | " | .953 | 1.42 | .49 | .22 | 11.01 | 83.9 | 274 | Dropwise at polymn temp | Troublesome foam, but made ok |

TABLE 2-continued

T16/ACRYLIC EMULSION POLYMERS WITH 5 AND 10 WT % ACRYLIC

| Emulsion Composition | Wt % | I.V. | EG | DEG | TEG | COOH (eg/10⁶) | Tg (° C.) | Tm (° C) | Addition Method | Comments |
|---|---|---|---|---|---|---|---|---|---|---|
| EHA/TMPTA (M) | " | .682 | — | .16 | .17 | 10.49 | 83.2 | 277 | Initially | Excessive foam at vacuum stage |
| EHA/TMPTA (M) | " | .430 | .25 | .04 | .15 | 9.67 | 85.01 | 286 | " | Much foam-appeared to be insolubles |
| EHA/TMPTA (M) | " | .649 | — | .22 | .20 | 9.17 | 82.2 | 279 | Dropwise at polymn temp | Lots of foam |
| EHA/TMPTA (M) | " | .646 | — | .16 | .13 | 9.65 | 85.4 | 283 | Dropwise during heat up | Foam during vacuum stage |
| EHA/TMPTA (M) | " | .503 | .59 | .27 | .23 | 9.36 | 84.8 | 282 | Dropwise at polym temp with DF | Lots of foam, but makeable |
| | " | .785 | 3.25 | .71 | .31 | 12.11 | 80.1 | 272 | Dropwise at polymn temp | Some foam during addition- good during vacuum |
| MMA/BA (10/90) (S) | " | .800 | .19 | .44 | .26 | 31.53 | 88.9 | 276 | Dropwise at polymn temp | Not a lot of foam |
| MMA/BA 75/10 (S) | 10 | .592 Inso 1 | — | 1.07 | .50 | 14.05 | 82.6 | 266 | Dropwise at polymn temp | Not a lot of foam |
| MMA/BA 75/10 (S) | " | .591 Inso 1 | .24 | 1.14 | .47 | 15.05 | 83.3 | 267 | Dropwise at polymn temp | Not a lot of foam |
| MMA/BA 75/10 (S) | " | .606 Inso 1 | 6.51 | 1.76 | .48 | 16.99 | 82.7 | 263 | Dropwise after ~5 min vacuum | Solid formed when emulsion added- some foam during addition |
| MMA/BA 10/90 (S) | " | .512 Inso 1 | 2.42 | 1.99 | .82 | 4.89 | 74.7 | 258 | Dropwise at polymn temp | Foaming during addition but not vacuum |
| EHA/BA 5/95 (S) | " | .485 | 2.12 | 1.55 | *57 | 10.24 | 77.0 | 263 | Dropwise at polymn temp | Emulsion collected around stirrer |

Emulsions with (M) designation were with surfactant; those with (S) designation were without surfactant PREPARATION OF POLYESTER/ACRYLIC EMULSION BLENDS—POLY (ETHYLENETEREPHAHALATE) (PET) WITH ACRYLIC EMULSIONS IN EG

EXAMPLE—17

Control PET Without Latex

The equipment and set-up used to prepare the PET polymers are the same as outlined in Example 11 for PCT polymers. Bis (2-hydroxyethyl) terephthalate (127 g., 0.5 moles) and Ti(iOPr)$_4$ catalyst solution [2.07% Ti (wt/vol)] were placed in the flask. The flask was placed in the molten bath at 200° C. and heated to 275–280° C. When the polymerization temperature was reached (~30 min), the system was placed under ≦1.0 mm Hg and held for ~45 minutes. A polymer was obtained with the following properties: I.V. of 0.452; mole % DEG of 1.36 (based on total of all glycols); $2^{nd}$ cycle $T_g$ of 80.4° C.; and $2^{nd}$ cycle $T_m$ of 257.2° C.

EXAMPLE—18

Comparative Example

PET/10 Wt % acrylic emulsion in EG with traditional surfactant (95/5 EHA/IMPTA; ABEX surfactant). The procedure and weights of initial materials used were the same as outlined in Example 17. When the polymerization temperature was reached, the system was placed under vacuum and held for 5 minutes to build some molecular weight. The system was then let down to a nitrogen purge and 10 wt % acrylic emulsion (35.56 g. of a 30 wt % solids emulsion) was added dropwise over 7 minutes. Some slight foaming was observed and the system was held an additional 5 minutes before the vacuum was reapplied. The system was placed again under full vacuum for ~42 minutes. A polymer with the following properties was obtained: I.V. of 0.54; mole % DEG of 11.52; $2^{nd}$ cycle $T_g$ of 65.7° C.; $2^{nd}$ cycle $T_m$ of 226° C.

Quenched film pressed from the dried polymer was opaque, which indicated good dispersibility of the acrylic emulsion in PET. Microscopy analyses of the film showed particle sizes ≦10 microns.

EXAMPLE—19

Comparative Example

PET/10 Wt % acrylic emulsion in EG with traditional surfactant (95/5 EHA/TMPTA; Henkel FES 77 surfactant). Polymer prepared similar to Example 18. Obtained a polymer with the following properties: I.V. of 0.561; mole % DEG of 15.22; $2^{nd}$ cycle $T_g$ of 61.1° C.; $2^{nd}$ cycle $T_m$ of 220.7° C.

Film was opaque and showed good dispersibility. Microscopy analyses indicated particle size slightly less than Ex. 9 and probably ≦5 microns.

EXAMPLE—2

PET with 10 wt % of Novel Acrylic Emulsions in EG Without Surfactant

PET with 10 wt % 95/5 EHA/BA Acrylic Emulsion in EG without Surfactant (Example 1). Polymer was prepared similar to Example 18 except that 23.94 g. of a 44.56 wt % solids emulsion of 95/5 EHA/BA prepared without surfactant was added dropwise to the polymer melt over 15 minutes with no foam generation. The system was placed back under vacuum and held for ~22 minutes. A polymer with the following properties was obtained: I.V. of 0.821; mole % DEG of 14.15; $2^{nd}$ cycle $T_g$'s of −23 and 67.5° C.; $2^{nd}$ cycle $T_m$ of 215.2° C. The film was opaque and showed good dispersibility of the emulsion. Microscopy analyses showed particle size ≦5 microns.

EXAMPLE—21

Repeat of Example 20

Addition time of emulsion was 13 minutes. Vacuum time of ~27 minutes. A polymer with the following properties was obtained: I.V. of 0.726; mole % DEG of 14.95; $2^{nd}$ cycle $T_g$'s of −19.2 and 68.6° C.; $2^{nd}$ cycle $T_m$ of 218° C. The film was opaque and showed good dispersibility of the emulsion. Microscopy analyses showed particle size of ≦2 microns.

EXAMPLE—22

PET/10 wt % EHA Acrylic Emulsion in EG without Surfactant (Example 7) Polymer was prepared similar to Example 18 except that 34.08 g. of a 31.31% solids emulsion of EHA without surfactant was added to the polymer melt. Addition time of the emulsion was 15 minutes and the polymer was held under final vacuum for ~31 minutes. A polymer with the following properties was obtained: I.V. of .727; mole % DEG of 19.32; $2^{nd}$ cycle $T_g$'s of −20.82 and 59.50° C.; $2^{nd}$ cycle $T_m$ of 199.3° C. The pressed film was opaque and showed good dispersibility. Microscopy analyses showed good dispersion with small particles of ≦2 microns.

EXAMPLE—23

PET with 10 Wt % 95/5 EHA/BA Acrylic Emulsion in EG without Surfactant (Example 1) with Sodium Acetate added to Polycondensation Step The polyester/acrylic composition and method of preparation were the same as Example 20, except that 0.0138 g. of anhydrous sodium acetate was added with the bis(2-hydroxyethyl) terephthalate/catalyst charge. The acrylic emulsion was added over 6 minutes and the final vacuum time was 23 minutes. A polymer with the following properties was obtained: I.V. of 0.722; mole % DEG of 4.24; $2^{nd}$ cycle $T_g$ of 78.4° C.; $2^{nd}$ cycle $T_m$ of 243.0° C. Microscopy showed that the particles were small (1–2 microns) and well dispersed in the polyester matrix.

EXAMPLE—24

PET/10 wt % EHA Acrylic Emulsion in EG without Surfactant (Example 7) with Sodium Acetate Buffer added in the Polycondensation Stage Polyester/Acrylic composition and method of preparation were the same as outlined in Example 22 except that 0.196 g. of anhydrous sodium acetate was added with the bis(2-hydroxyethyl) terephthalate/catalyst charge. The acrylic emulsion was added over 10 minutes and the final vacuum time was 23 minutes. A polymer with the following properties was obtained: I.V. of 0.783, mole % DEG of 7.53; $2^{nd}$ cycle $T_g$ of 76.6° C.; $2^{nd}$ cycle $T_m$ of 232.0° C. Microscopy showed that the particles were small (1–2 microns) and well dispersed in the polyester matrix.

EXAMPLE—25

PET with 10 Wt % 95/5 EHA/BA Acrylic Emulsion in EG without Surfactant and with Neutralized Emulsion (Example 6). The polyester/acrylic composition and method of preparation were the same as Example 20 except that 21.12 g. of a 37.93 wt % solids emulsion that had been neutralized to pH of 6.5 was used. The emulsion was added over 7 minutes and the final vacuum time was 31 minutes. A polymer with the following properties was obtained: I.V. of 0.691; mole % DEG of 4.47; $2^{nd}$ cycle $T_g$ of 78.0° C.; $2^{nd}$ cycle $T_m$ of 242.0° C. Microscopy showed that the particles were small (<5.0 microns, most, <2.0 microns) and well dispersed in the polyester matrix.

EXAMPLE—26

PET with 10 Wt % EHA Acrylic Emulsion in EG without Surfactant and with Neutralized Emulsion (Example 8). The polyester/acrylic composition and method of preparation were the same as Example 22 except that 34.42 g. of a 31.0 wt % solids emulsion that had been neutralized to pH of 6.5 was used. The emulsion was added over 9 minutes and the final vacuum time was 30 minutes. A polymer with the following properties was obtained: I.V. of 0.666; mole % DEG of 3.91; $2^{nd}$ cycle $T_g$ of 79.0° C.; $2^{nd}$ cycle $T_m$ of 243° C. Microscopy showed that the particles were small (most <2.0 microns) and well dispersed in the polyester matrix.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a condensation polymer/latex polymer blend comprising the steps of:
   (a) preparing a latex composition comprising: i) a sulfo-polyester polymer; and ii) a latex polymer dispersed in a liquid continuous phase;
   (b) introducing the latex composition into a condensation polymerization reaction medium prior to or during a condensation polymerization reaction, wherein the condensation polymerization reaction medium comprises (1) a diacid, diisocyanate, dialkyl carbonate, esters, diaryl carbonate, dihalo carbonate or a mixture thereof, wherein at least one of the liquid continuous phase, the condensation polymerization reaction medium, or the sulfo-polyester polymer comprises a diol component; and
   (c) polymerizing the diol component and component b(l), thereby forming a condensation polymer/latex polymer blend.

2. The method of claim 1, wherein the liquid continuous phase comprises a diol component.

3. The method of claim 1, wherein the diol component is from about 0.01 to about 100% by weight of the liquid continuous phase.

4. The method of claim 1, wherein the diol component is from about 40 to about 100% by weight of the liquid continuous phase.

5. The method of claim 1, wherein the liquid continuous phase comprises a water component.

6. The method of claim 1, wherein the sulfo-polyester polymer comprises residues of a dicarboxylic acid, a diol and a difunctional sulfo-monomer.

7. The method of claim 6, wherein the diol component of the sulfo-polyester polymer comprises ethylene glycol, diethylene glycol, triethylene glycol, 1,2-cyclohexandimethanol, 1,3 cyclohexandimethanol, 1,4-cyclohexanedimethanol, propane-1,3-diol, butane-1,4-diol, pentane-1,5-diol, hexane-1,6-diol, 3-methyl-2,4-pentanediol, 2-methyl-1,4-pentanediol, 2-2-4-trimethyl-1,3-pentanediol, 1,3-hexanediol, 1,4-di-(hydroxyethoxy)-benzenediol, 2,2-bis-(4-hydroxycyclohexyl)-propanediol, 2,4-dihydroxy-1,1,3,3-trimethyl-cyclobutanediol, and 2,2-bis-(4-hydroxypropoxyphenyl)-propanediol and wherein the difunctional sulfo-monomer of the sulfo-polyester comprises sulfophthalic acid, sulfoterephthalic acid, sulfoisophthalic acid, 4-sulfonaphthalene-2,7-dicarboxylic acid, the esters thereof, or a mixture thereof.

8. The method of claim 6, wherein the difunctional sulfo-monomer of the sulfo-polyester polymer comprises from about 8 mole percent to about 25 mole percent based on 100 mole percent dicarboxylic acid.

9. The method of claim 1, wherein the diol component comprises ethylene diol, 1,3-trimethylene diol, 1,3-propylene diol, 1,4-butanediol, 1,5-pentanediol, 1,6 hexanediol, 1,7-heptanediol, 1,8-octanediol, 1,9-nonanediol, neopentyl diol, cis- or trans cyclohexanedimethanol, cis or trans 2,2,4,4-tetramethyl-1,3 cyclobutanediol, diethylene diol, or a mixture thereof.

10. The method of claim 1, wherein the latex polymer particles comprise a residue of a non-acid vinyl monomer of acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethyihexyl acrylate, 2-ethylhexyl methacrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, $C_1$–$C_{18}$ alkyl crotonates, di-n-butyl maleate, α- or -β-vinyl naphthalene, di-octylmaleate, allyl methacrylate, di-allyl maleate, di-allylmalonate, methyoxy-butenyl methacrylate, isobomyl methacrylate, hydroxybutenyl methacrylate, hydroxyethyl(meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, butadiene, vinyl(meth)acrylates, isopropenyl(meth)acrylate, cycloaliphaticepoxy(meth) acrylates, ethylformamide, 4-vinyl-1,3-dioxolan-2-one, 2,2-dimethyl-4 vinyl-1,3-dioxolate, 3,4-di-acetoxy-1-butene, or a mixture thereof.

11. The method of claim 1, wherein the latex composition continuous phase and the condensation polymerization reaction medium each comprise a diol component.

12. The method of claim 1, wherein component (b)(1) comprises a diacid, thereby forming a polyester for the condensation polymer.

13. The method of claim 1, wherein the sulfo-polyester polymer co-reacts in the condensation polymerization reaction and wherein the sulfo-polyester is partially or fully combined onto the condensation polymer backbone.

14. The method of claim 1, wherein the sulfo-polyester does not co-react in the condensation polymerization reaction and wherein the sulfo-polyester poolymer is not combined onto the condensation polymer backbone.

15. The method of claim 1, wherein glass fibers are added to the condensation reaction medium prior to or during the condensation reaction and wherein the glass fibers comprise from about 10 to about 50 wt. % of the condensation polymer.

* * * * *